United States Patent
Nagamatsu et al.

(10) Patent No.: US 6,819,301 B2
(45) Date of Patent: Nov. 16, 2004

(54) INFORMATION PROVIDING SYSTEM AND INFORMATION PROVIDING APPARATUS FOR MOBILE OBJECT

(75) Inventors: Kenji Nagamatsu, Kokubunji (JP); Kenichi Mizuishi, Hachiouji (JP)

(73) Assignee: Hitachi, Ltd., Tokyo (JP)

( * ) Notice: Subject to any disclaimer, the term of this patent is extended or adjusted under 35 U.S.C. 154(b) by 44 days.

(21) Appl. No.: 10/440,082

(22) Filed: May 19, 2003

(65) Prior Publication Data

US 2004/0093392 A1 May 13, 2004

(30) Foreign Application Priority Data

Oct. 23, 2002 (JP) ..................................... P2002-307789

(51) Int. Cl.[7] .............................................. G01C 21/30
(52) U.S. Cl. ...................................... 343/850; 701/208
(58) Field of Search ......................... 343/850; 701/208, 701/213, 209, 207, 210, 211, 212, 23, 24, 25; 340/995, 990

(56) References Cited

U.S. PATENT DOCUMENTS 6,430,499 B1 * 8/2002 Nakano et al. ............. 701/208

FOREIGN PATENT DOCUMENTS

| JP | 2000-324246 | 5/1999 |
|---|---|---|
| JP | 2001-202373 | 1/2000 |
| JP | 2002-132645 | 10/2000 |
| JP | 2002-140362 | 10/2000 |

* cited by examiner

Primary Examiner—James Clinger
(74) Attorney, Agent, or Firm—Reed Smith LLP; Stanley P. Fisher, Esq.; Juan Carlos A. Marquez, Esq.

(57) ABSTRACT

Disclosed here is an information providing system for mobile objects. The system obtains information of a moving purpose of the user of each mobile object to provide the user with information matching with the moving purpose. The information providing system comprises route type determining apparatus for determining the type of the current route on which the user is moving, provided information selecting unit for selecting information to be provided to the user according to the route type determined by the route type determining apparatus, and provided information presenting means for presenting the information selected by the provided information selecting unit to the user. Therefore, the user can receive more proper information according to the user's moving purpose at that time, thereby the convenience of the user is improved while the information provider can improve the advertisement effect by transmitting information to more proper users.

16 Claims, 23 Drawing Sheets

| STARTING POINT | DESTINATION | DATE |
|---|---|---|
| HOME | ○○SUPERMARKET | 9/25 18:30 |
| ○○SUPERMARKET | HOME | 9/25 19:45 |
| HOME | ××CORP. | 9/26 8:15 |
| ××CORP. | HOME | 9/26 19:15 |
| HOME | ××CORP. | 9/27 8:10 |
| ××CORP. | HOME | 9/27 17:30 |
| ⋮ | | |

| STARTING POINT | DESTINATION | DATE |
|---|---|---|
| HOME | ○○SUPERMARKET | 9/25 18:30 |
| ○○SUPERMARKET | HOME | 9/25 19:30 |

FIG.11

| INTENTION ID | MOVING PURPOSE |
|---|---|
| 1 | COMMUTING(WHEN GOING TO WORK),THERE'S MUCH TIME |
| 2 | COMMUTING(WHEN GOING TO WORK),THERE'S LESS TIME |
| 3 | COMMUTING(WHEN GOING TO HOME),DIRECT TO HOME |
| 4 | COMMUTING(WHEN GOING TO HOME),NEED TO BUY SOMETHING |
| 5 | LEISURE TIME(JUST DRIVER) |
| 6 | LEISURE TIME(WITH CHILDREN) |
| ⋮ | |

FIG.14

| CONTENT ID | GENDER | AGE | JOB | HOBBY | INTENTION TO MOVE | AREA | PROVIDED INFORMATION |
|---|---|---|---|---|---|---|---|
| 1 | MALE | 20 | STUDENT | N/C | LEISURE | KANTO | OO MAGAZINE NOW IN STORE!! THIS ISSUE COVERS THE RECOMMENDATION OF LEISURE SPORTS FOR THIS AUTUMN. |
| 2 | MALE | 30 | N/C | FISHING | LEISURE | MINAMI-KANTO | THIS WEEKEND A FISHING TOURNAMENT WILL BE HELD AT O× LAKE. |
| 3 | FEMALE | 20 | HOUSEWIFE | N/C | SHOPPING (WHEN GOING OUT) | COUNTRY-WIDE | ××MAGAZINE OCT. IT'LL OFFER THOSE DESIGNS PRESENTED AT AUTUMN COLLECTION THIS YEAR. |
| ... | ... | ... | ... | ... | ... | ... | |
| 1234 | MALE | 40 | SALES | N/C | COMMUTING (WHEN GOING OUT) | COUNTRY-WIDE | "BUSINESS MODEL" THIS BOOK HAS BEEN PUBLISHED... |
| ... | ... | ... | ... | ... | ... | ... | |

FIG.17

| STARTING POINT | DESTINATION | TIME | ROUTE TYPE |
|---|---|---|---|
| HOME | ○○CORP. | MON. 8:32 | COMMUTING(WHEN GOING TO WORK) |
| ○○CORP. | ××SUPERMARKET | MON. 18:25 | COMMUTING(WHEN GOING TO HOME) |
| ××SUPERMARKET | HOME | MON. 19:18 | COMMUTING(WHEN GOING TO HOME) |
| . . . | . . . | . . . | . . . |
| HOME | △△PARK | SUN. 10:37 | LEISURE(FOR CHILDREN) |
| . . . | . . . | . . . | . . . |

FIG.19

| POINT 1 | POINT 2 | SIMILARITY |
|---|---|---|
| *CORP. | *CORP. | 60 |
| *SUPERMARKET | *SUPERMARKET | 80 |
| *PARK | *PARK | 80 |
| *LAND | *PARK | 70 |
| . | . | . |
| . | . | . |
| . | . | . |

FIG.20

| TIME 1 | TIME 2 | SIMILARITY |
|---|---|---|
| MON.-FRI. 7:00~9:00 | MON.-FRI. 7:00~9:00 | 90 |
| MON.-FRI. 17:00~20:00 | MON.-FRI. 17:00~20:00 | 90 |
| SUN. | SAT. | 80 |
| SAT. | SUN. | 80 |
| . | . | . |
| . | . | . |
| . | . | . |

| POSITION | TIME | ROUTE TYPE |
|---|---|---|
| (42.18 , 141.95) | MON. 8:32 | COMMUTING(WHEN GOING TO WORK) |
| (42.15 , 142.02) | MON. 18:25 | COMMUTING(WHEN GOING TO HOME) |
| (42.35 , 142.47) | MON. 19:18 | COMMUTING(WHEN GOING TO HOME) |
| . . . | . . . | . . . |
| (41.40 , 142.82) | SUN. 10:37 | LEISURE(FOR CHILDREN) |
| . . . | . . . | . . . |

FIG.26

| ROUTE NAME | STARTING POINT(LATITUDE,LONGITUDE) | DESTINATION POINT(LATITUDE,LONGITUDE) |
|---|---|---|
| ROAD 1 | (35.18 , 142.35) | (35.21 , 142.39) |
| ROAD 2 | (42.11 , 141.98) | (42.18 , 142.05) |
| . . . | . . . | . . . |

FIG.27

| ROUTE NAME | POSITION | TIME | DIRECTION |
|---|---|---|---|
| ROAD 3 | (42.18 , 141.95) | 18 : 53 : 00 | |
| ROAD 3 | (42.13 , 141.97) | 18 : 54 : 00 | NORMAL |
| ROAD 2 | (42.11 , 141.98) | 18 : 55 : 00 | NORMAL |
| ROAD 2 | (42.13 , 141.99) | 18 : 56 : 00 | NORMAL |
| ROAD 2 | (42.15 , 142.02) | 18 : 57 : 00 | NORMAL |
| . . . | . . . | . . . | . . . |

FIG.28

| GUIDING ROUTE NAME | CONTAINED ROUTES |
|---|---|
| GUIDING ROUTE 1 | ROAD 3 |
| GUIDING ROUTE 2 | ROAD 3 → ROAD 2 |
| GUIDING ROUTE 3 | ROAD 3 → ROAD 2 → ROAD 3 |
| . . . | . . . |

FIG.29

| GUIDING ROUTE NAME | DISPLAYED DATA | READ-OUT DATA |
|---|---|---|
| GUIDING ROUTE 1 | TITLE "OO", IN 18××, CREATED BY △△ | THIS OO WAS CREATED IN 18××, MUCH AFFECTED BY IMPRESSIONISM. |
| GUIDING ROUTE 2 | TITLE "◎◎", IN 18××, CREATED BY ◇◇ | WHEN ◇◇ CREATED THIS PIECE. |
| GUIDING ROUTE 3 | TITLE "OO", IN 18××, CREATED BY △△ | IT IS THE WORK BY ◇◇ YOU WATCHED A LITTLE WHILE AGO THAT AFFECTED MUCH TO THIS OO. |
| . . . | . . . | . . . |

INFORMATION PROVIDING SYSTEM AND INFORMATION PROVIDING APPARATUS FOR MOBILE OBJECT

BACKGROUND OF THE INVENTION

1. Field of the Invention

The present invention relates to an information providing system and an information providing apparatus for mobile objects. More particularly, the present invention relates to an information providing system for mobile objects, which is configured so as to change information to be provided to each user (mobile object) according to starting and destination points of a route on which the user is moving or the route type.

2. Description of Related Art

Now that on-vehicle information terminals, typically car navigation systems, as well as portable telephones provided with the GPS respectively have come into wide use, various apparatuses that move with the users (mobile objects) and provide the users with various helpful information are spreading rapidly.

So far, those apparatuses have never gone beyond displaying the current spot and/or route on a map while searching and displaying information of near-by shops and stores existing along the route on which the user is moving. In the near future, however, the users will come to expect more enhanced apparatuses with which the users can get much more information using communication functions.

Under such circumstances, there have been many inventions proposed for providing such information providing apparatuses that have various functions. For example, one of those functions provided for such an apparatus is used to store and manage information of favorite items of respective users beforehand in the information providing center that functions as a source of various information items to be provided to users, thereby those information items are customized according to the information of each user's stored favorite items upon a request from the user (ex., the patent document 1). There is also another function for recording the moving history of each user, thereby the user is provided with information related to his/her desired place/facility with priority, obtained from the moving history of a different user who has already visited the place/facility and his/her moving history is similar to that of the former user (ex., the patent document 2).

There is still another function for recording how many users have accessed each provided information menu so as to provide each user with frequently used information menus with priority, thereby improving the convenience of the user (the patent document 3). There is also still another function for recording the moving history of each mobile object to estimate the next destination according to the recorded moving history so as to provide the user of the mobile object with its related information. And, there is also still another function for extracting such information as an area in which a user moves frequently, for example, a place where the user stays for a long time, from his/her moving history so that the user is to be provided with information related to the area/place (ex., the patent document 4).

[Patent document 1] Official gazette of JP-A No. 132645/2002

[Patent document 2] Official gazette of JP-A No. 140362/2002

[Patent document 3] Official gazette of JP-A No. 202373/2001

[Patent document 4] Official gazette of JP-A No. 324246/2000

If a user moves from a place to another, what information the user is to need depends significantly on why the user is moving on the route in addition to the information of places around the route itself. This is because it often occurs that what information the user requires during the moving on a route comes to differ between when the user is going to go to work in the morning of a week day and when the user enjoys driving on a holiday.

However, no conventional technique has been developed so far to cope with such a difference between the two occasions by providing each user with different information items according to the moving purpose of the user.

According to the invention described in the patent document 1, the user is requested to register information of his/her favorite items beforehand. Therefore, the user is requested to update his/her favorite item information each time the user has a different moving purpose from the purposes in the past. This has been troublesome and inconvenient for the user.

According to the invention described in the patent document 3, in which the user is provided with frequently accessed information menus with priority, the user cannot understand what occasions the user has accessed those menus in concretely.

And, according to the inventions described in the patent documents 2 and 4, in which the user is provided with information related to each route according to his/her moving history data, as well as the moving history data of other users, such history data is insufficient to identify why the user is moving on the route currently. Consequently, any of the inventions described in the above patent documents 1 to 4 cannot solve the problem that it cannot avoid to provide the user who is moving on a route with completely the same information regardless of the user's moving purpose (going to go to work or enjoying driving his/her car leisurely).

Under such circumstances, it is an object of the present invention to provide a system and a method for providing the user of each mobile object with useful information matching with the user's moving purpose, selected from information obtained beforehand in relation to each route having been used by the user, as well as to each user's moving purpose.

SUMMARY OF THE INVENTION

In order to solve the above conventional problems, according to one aspect of the present invention, the information providing system to be employed for a mobile object comprises route type determining apparatus, provided information selecting unit for selecting information to be provided to the user according to the route type determined by the route type determining apparatus, and provided information presenting means for presenting information selected by the provided information selecting unit to the user.

According to another aspect of the present invention, the information providing system for a mobile object further includes starting/destination point determining unit. And, the route type determining apparatus determines the type of a route used by the user according to both starting and destination points determined by the starting/destination point determining unit, as well as the clock time at that time.

According to still another aspect of the present invention, the starting/destination point determining unit of the information providing system for a mobile object determines both starting and destination points through communication with the user and the route type determining apparatus determines a route type through communication with the user.

BRIEF DESCRIPTION OF THE DRAWINGS

FIG. 11 is a structure of moving purpose data used in the first embodiment of the present invention;

FIG. 14 is a structure of provided information used in the first embodiment of the present invention;

FIG. 17 is a structure of route type data used in the second and third embodiments of the present invention;

FIG. 19 is a structure of data for defining the similarity of route type data used in the second embodiment of the present invention;

FIG. 20 is a structure of data for defining the similarity of route type data used in the second embodiment of the present invention;

FIG. 26 is a structure of position/route data used in the fourth embodiment of the present invention;

FIG. 27 is a structure of route history data used in the fourth embodiment of the present invention;

FIG. 28 is a structure of guiding route topology data used in the fourth embodiment of the present invention; and FIG. 29 is a structure of guiding route topology data used in the fourth embodiment of the present invention.

DETAILED DESCRIPTION OF THE PREFERRED EMBODIMENTS

Hereunder, the preferred embodiments of the present invention will be described with reference to the accompanying drawings.

Figure 1:
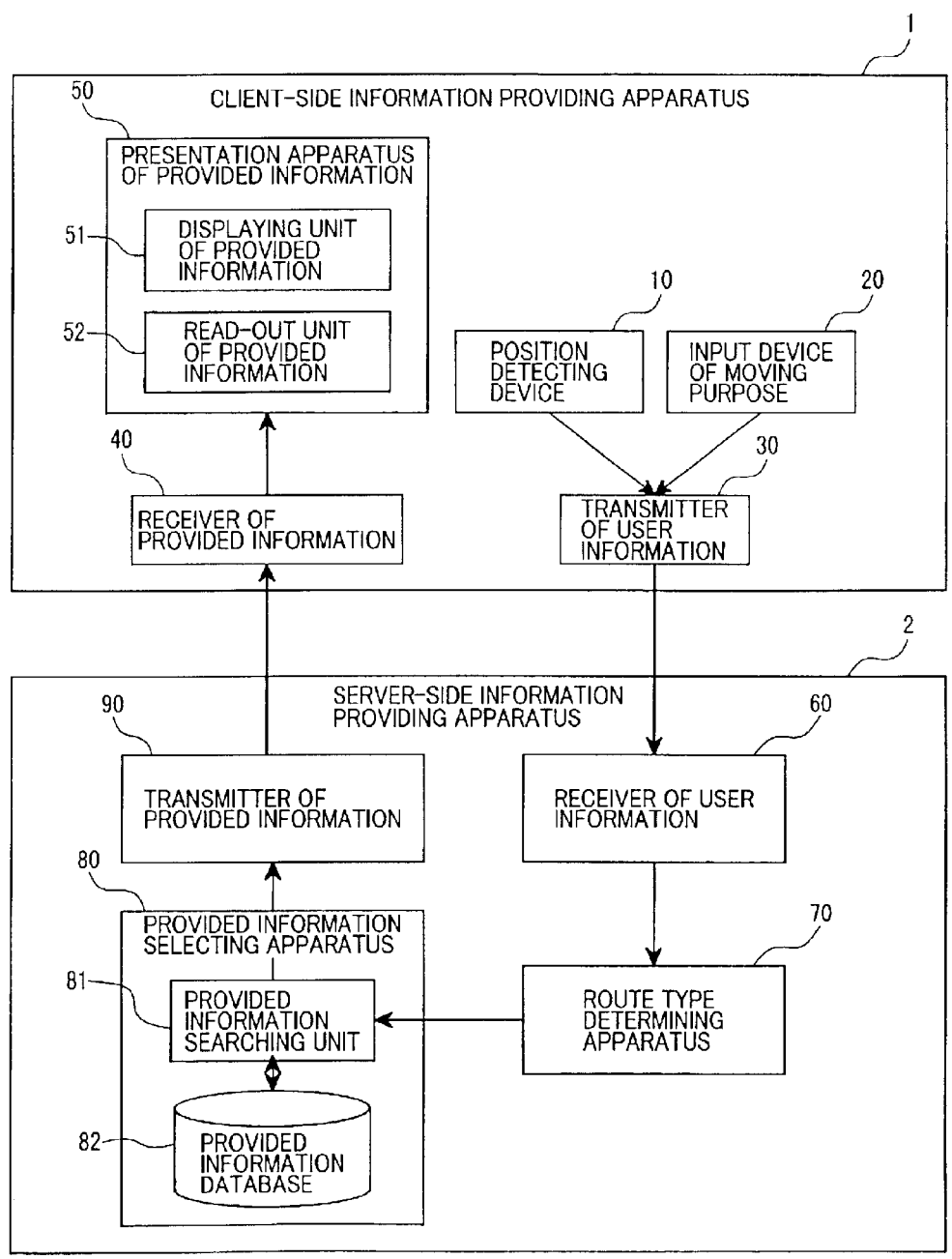
FIG. 1 is a basic block diagram of an information providing system of the present invention.

FIG. 1 shows a block diagram of an information providing system of the present invention for a mobile object. As shown in FIG. 1, in one aspect of the present invention, the information providing system is basically configured by a client-side information providing apparatus 1 carried by the user or moved together with the user and a server-side information providing apparatus 2 for receiving user information from the client-side information providing apparatus 1 to provide the terminal with information matching with the user's moving purpose and the route type used for the moving.

The client-side information providing apparatus 1 comprises a position detecting device 10, an input device of moving purpose 20 for requesting the user to input his/her moving purpose through an interface or determining the purpose automatically, a transmitter of user information 30 for transmitting information collected by the position detecting device 10 and the input device of moving purpose 20 to the server-side information processing apparatus 2, a receiver of provided information 40 for receiving information provided to the user at the client-side information providing apparatus 2, and a provided information presenting apparatus 50 for presenting provided information received by the receiver of provided information 40 to the user. The provided information presenting apparatus 50 is configured by a displaying unit of provided information 51 and a read-out unit of provided information 52 for presenting provided information aurally with a voice.

The server-side information providing apparatus 2 comprises a receiver of user information 60 for receiving such user information as a position, a moving purpose, etc. of the user from the client-side information providing apparatus 1, a route type determining apparatus 70 for classifying routes used by the user into categories by purposes, a provided information selecting apparatus 80 for selecting information to be provided to the user according to the route type determined by the route type determining apparatus 70, and a transmitter of provided information 90 for transmitting provided information selected by the provided information selecting apparatus 80 to the client-side information providing apparatus 1. The provided information selecting apparatus 80 is configured by a provided information database 82 for storing information to be provided to the user and a provided information searching unit 81 for searching information to be provided to the user from the provided information database 82.

Although the information providing system of the present invention for a mobile object is configured basically as described above, the client-side information providing apparatus 1 may also be a portable route guiding apparatus to be carried by the user and used to guide the user on a route and obtain information related to the route. In addition, the information providing system may be such an on-vehicle information providing apparatus as a car navigation system installed in the user's car.

On the other hand, the server-side information providing apparatus 2 may also be configured as a server type one for communicating with the client-side information providing apparatus 2 and united with the client-side information providing apparatus 1 to realize the functions of the present invention in any apparatus to be carried by the user. The former configuration is preferred for systems for providing information related to routes in a wide range just like car navigation systems while the latter configuration is preferred for systems for providing information in a narrow range just like exhibition systems employed in museums and pavilions.

Furthermore, as to be described concretely in the preferred embodiments later, it is possible to realize some of the functions of the server-side information providing apparatus 2 at the client-side information providing apparatus 1 or some of the functions of the client-side information providing apparatus 1 at the server-side information providing apparatus 2.

Next, a description will be made for how to configure each component described above in the basic configuration of the present invention shown in FIG. 1.

At first, the position detecting device 10 is a device for detecting the current position of an information providing terminal moved together with the user. Generally, the position detecting device 10 uses a GPS (Global Positioning System) or apparatus for detecting the present position of the terminal through the triangulation performed among a plurality of base stations employed for some portable telephones. And, to detect a position using a route guiding system installed in a room, a method is usable for the system. According to the method, a wireless transmitter for transmitting the room number is installed in the room and the room number transmitted from the wireless transmitter is received by the position detecting device 10 to detect the current position (the room number). There is also another method usable for the system. According to the method, the user is requested to press a button each time the user comes to a point on a route without detecting the present position in detail, thereby the user's movement into the next room (exhibition) is detected and the present room (exhibition) where the user exists is determined according to the user's transit information in the room (exhibition)

The input device of moving purpose 20 is used to input or determine a route selected by the user and the user's moving purpose. This input device may have input means through which the user inputs a button or voice to select one of the choices displayed on the screen or use a touch sensor to input such a choice. There is also another method for making such a choice, for example, by reading out a plurality of choices to select one of them with a voice; in this case, no choice is displayed on the screen. In addition, there is still another method for enabling the user to extract a user's moving purpose through aural communication with the terminal.

Each of the transmitter of user information 30, the receiver of user information 60, the transmitter of provided information 90, and the receiver of provided information 40 may be replaced with a general wireless information communication apparatus respectively. Each of them may be replaced with any of the wireless LAN apparatuses that employ such a wireless LAN standard as the IEEE802.11a. For example, it may be realized as modem communication/packet communication through a portable telephone.

The displaying unit of provided information 51 may be any of such information display devices as the liquid crystal display (LCD), the CRT, or the like, as well as such an information printing device as a printer. On the other hand, the read-out unit of provided information 52 may employ a method for reading out provided information with a synthesized voice using a voice synthesizer and a speaker, as well as for transmitting/receiving the voice itself so as to be reproduced by a reproducing apparatus, not as a text for reading out provided information.

This completes rough description for a system for providing each mobile object with useful information in various aspects of the present invention. On the other hand, an object of the present invention is to provide an information providing system, so that the functions of the information providing system are expected to be realized as computer programs. Hereinafter, therefore, such a case for realizing the system functions as a computer program will be described with reference to the accompanying flowcharts.

Figure 2:
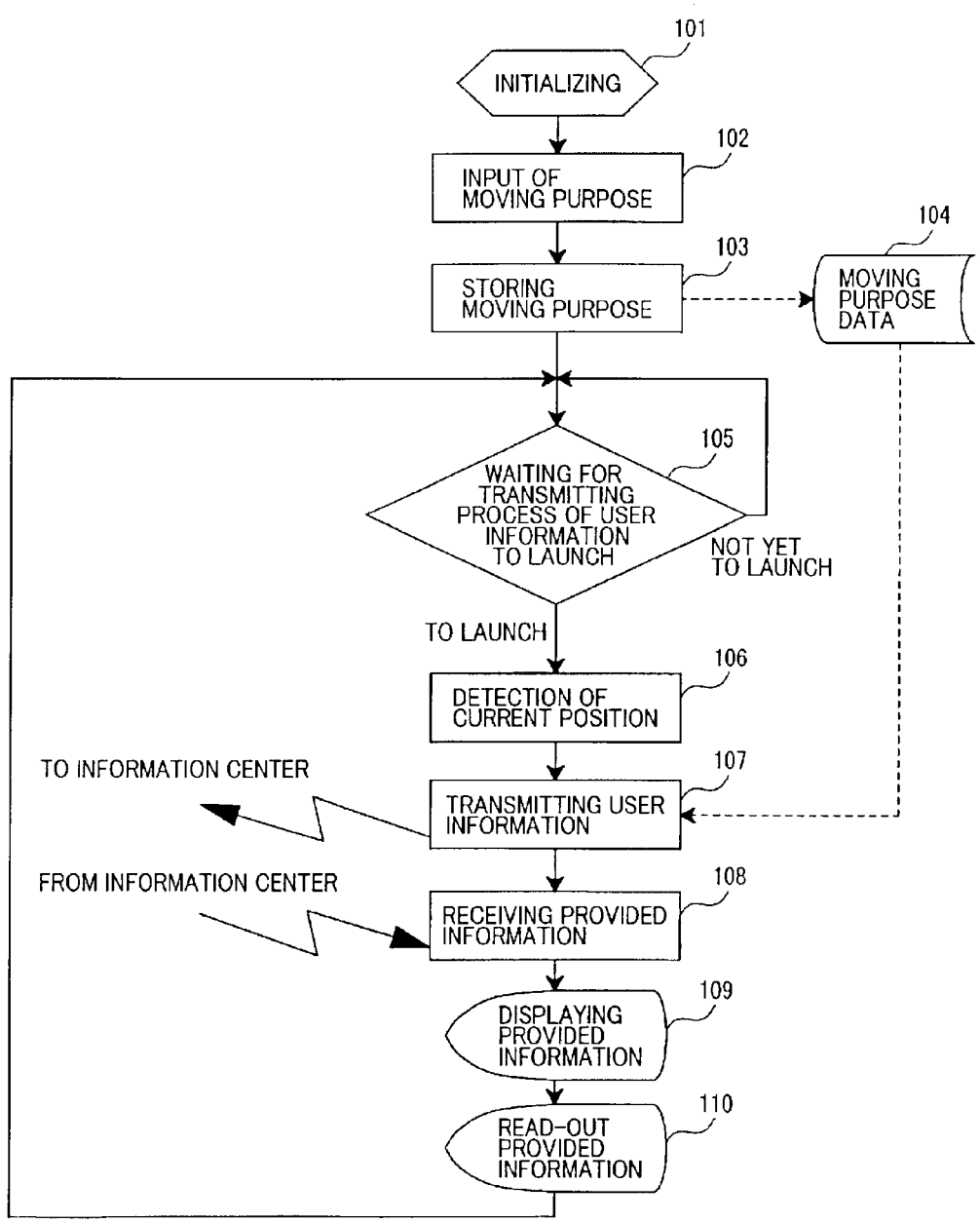
FIG. 2 is a flowchart of the processings by the information providing system of the present invention.

FIG. 2 shows a flowchart of the processings by the client-side information providing apparatus 1 shown in FIG. 1. The client-side information providing apparatus 1, when it is started up, initializes data in step 101. Then, the client-side information providing apparatus 1 requests the user to input a moving purpose through the input device of moving purpose 20 shown in FIG. 1 or enables the moving purpose to be inputted automatically in step 102. The moving purpose data is stored in step 104. After that, the client-side information providing apparatus 1 sleeps in step 105 to wait for user information to be received until the specified time for starting up the transmitter of user information 30 shown in FIG. 1 is reached. When the specified time is reached and the transmitter of provided information 30 is started up, the client-side information providing apparatus 1 obtains the current position in step 106, thereby the position detecting device 10 shown in FIG. 1 detects the current position. Then, the client-side information providing apparatus 1 goes to step 107 to transmit user information to the information center. The user information is composed of the moving purpose data stored in step 103, as well as the current position and the user authentication information, etc. detected in step 104. After that, the client-side information providing apparatus 1 receives provided information selected according to the user information from the information center in step 108, then displays only the target information included in the received information in step 109. The client-side information providing apparatus 1 then reads out the target information included in the received information in step 110. When the above processings are all terminated, the client-side information providing apparatus 1 goes back to step 105 to wait for the next information providing time.

Figure 3:
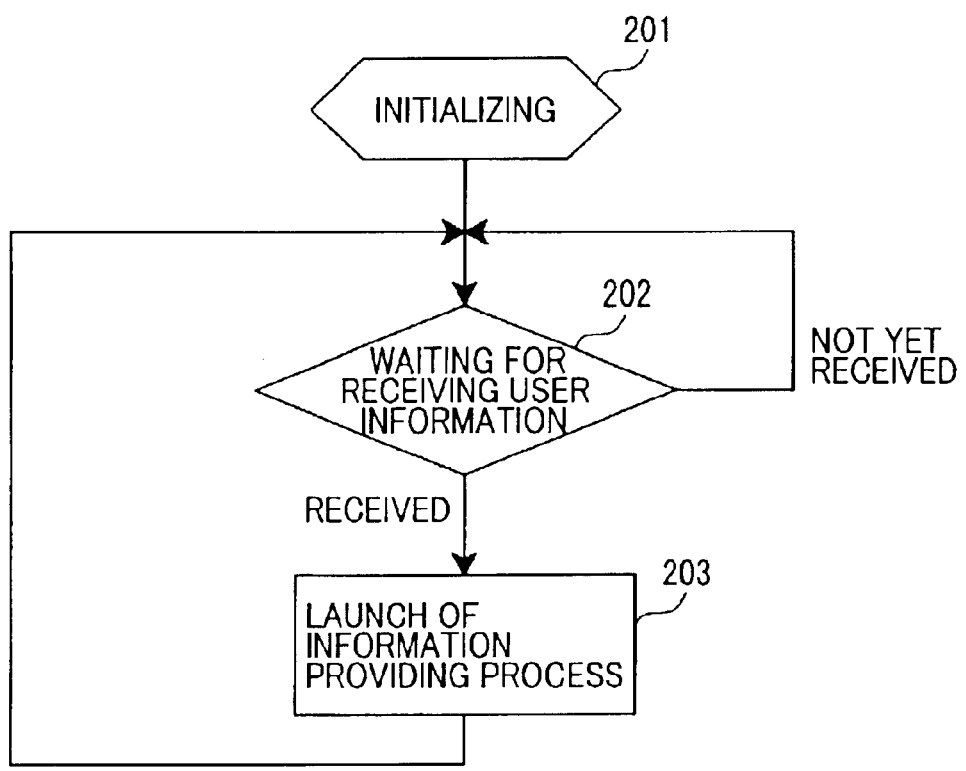
FIG. 3 is an overall flowchart of the processings by the information providing system of the present invention.
Figure 4:
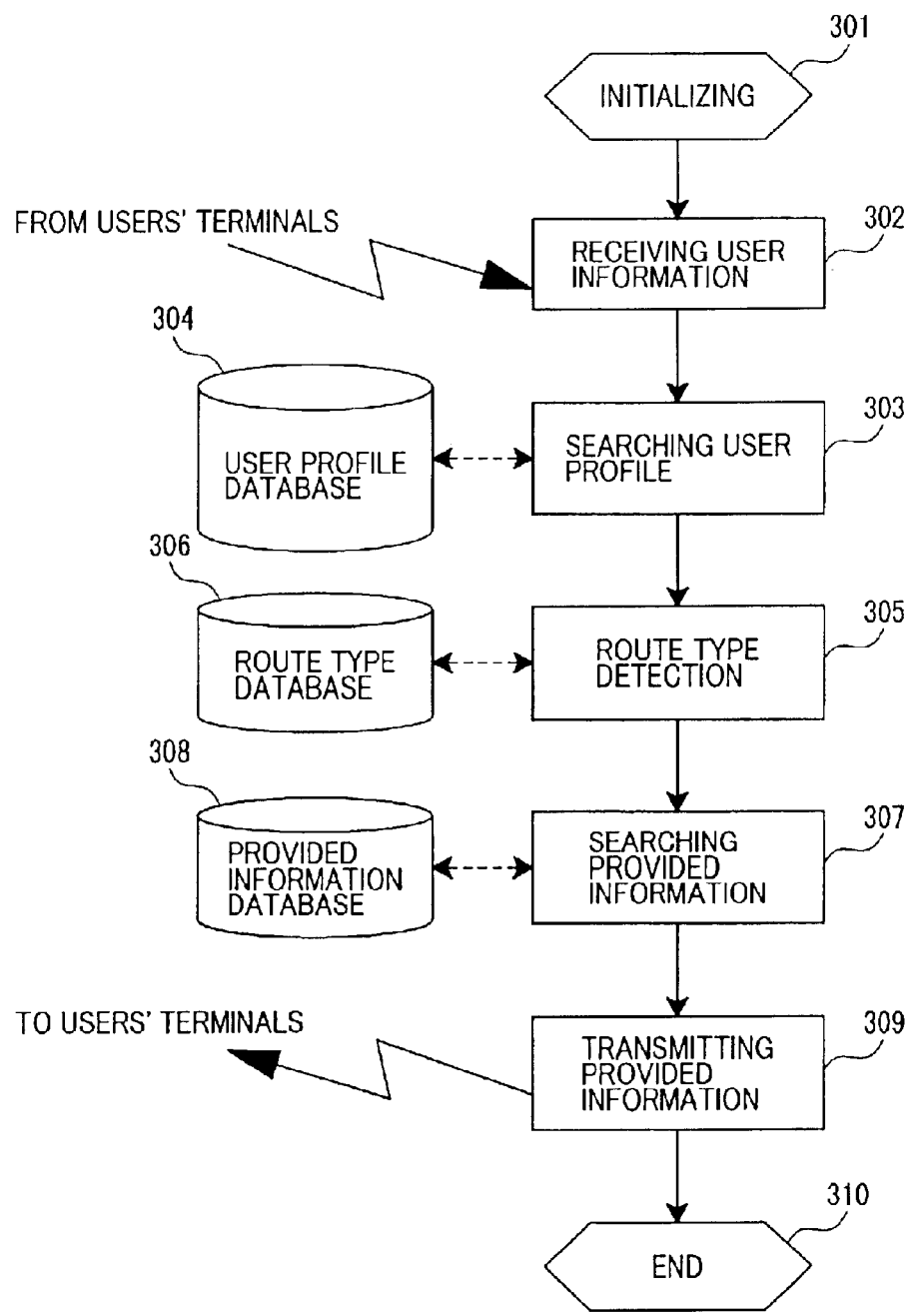
FIG. 4 is a flowchart of provided information selection processings by the information providing system of the present invention.

FIGS. 3 and 4 show flowcharts of the processings performed by the information center with respect to the flowchart shown in FIG. 2. The whole system in the information center works in accordance with the processing flowchart shown in FIG. 3. At first, the information center system is initialized in step 201, then waits for user information to be transmitted from a plurality of user terminals in step 202. If the system detects user information transmitted from a user terminal, the system begins to select information to be provided to the user terminal as another processing process in step 203. The system then goes to step 202 to wait for receiving the next user information. FIG. 4 shows a flowchart of selecting information to be provided to each user, which is started up in step 203. As shown in FIG. 4, at first, the system initializes the processing for selecting provided information in step 301. The system then receives user information from a specified user terminal actually in step 302. After that, the system obtains user profile information according to the user authentication information included in the received user information in step 303. Then, the system determines the type of the current route on which the user is moving according to the moving purpose information included in the received user information in step 305. The system then searches information to be provided to the user according to the determined route type and the user profile information in step 307. After that, the system transmits the searched information to the user terminal in step 309. Finally, the system performs an ending processing such as updating of the user's history of provided information, then terminates the selection of the information to be provided.

Hereinafter, a description will be made for the preferred embodiments of the information providing system configured basically as described above more concretely.

First Embodiment

At first, the first preferred embodiment of the present invention will be described. In this embodiment, a function for selecting information to be provided to each user is owned by the information center, not by the user terminal. The information to be provided to the user is thus passed to the user terminal through communication between the user terminal and the information center using a communication line. In this embodiment, it is premised that the user is requested to input his/her moving purpose concretely from his/her terminal.

Figure 5:
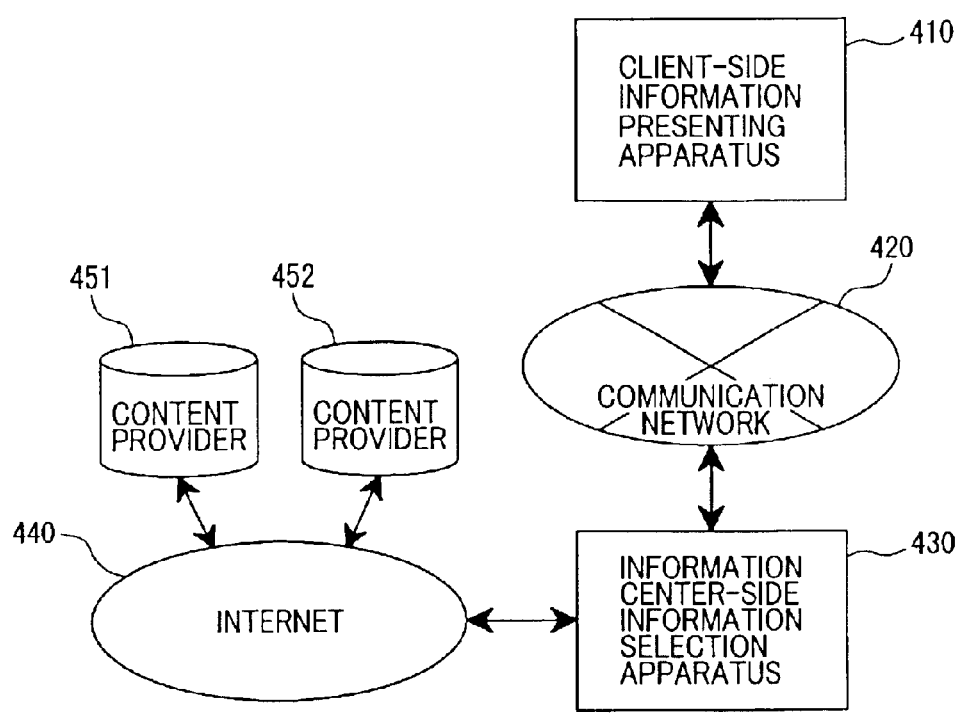
FIG. 5 is a block diagram of a communication type information providing system in the first to third embodiments of the present invention.

FIG. 5 shows a block diagram of a communication type information providing system in the first to third embodiments of the present invention. In this configuration of the information processing system, each information processing terminal is provided with communication functions so as to enable the information center to select information to be provided to each user to increase the amount of information and the user to be provided with information from other external content providers. In this first embodiment, for example, the information providing system may enable each user to communicate with the information center to determine the type of the route on which the user is moving currently, thereby enabling proper information to be presented to the user terminal just like position information services by car navigation systems and portable telephones.

In this embodiment, the information providing system is configured by a client-side information presenting apparatus 410, a communication line 420, an information center-side information selection apparatus 430, the Internet 440, and a plurality of content providers 451.

The client-side information presenting apparatus 410 moves together with the user and presents information to the user. This information terminal includes functions for detecting the current position of the user, requesting the user to input his/her moving purpose, transmitting the user information to the information center, and receiving information to be provided to the user from the information center, thereby the information is presented to the user.

The communication line 420 is used between the client-side information presenting apparatus 410 and the information center-side information selection apparatus 430 to transmit/receive user information and provided information. The communication line 420 may be of any of such communication means as a portable telephone and a PHS, as well as a wireless LAN. In this embodiment, it is premised here that the former communication means is employed while the means may be a general one.

The information center-side information selection apparatus 430 includes functions for selecting information to be provided to the user from among the information provided by content providers 451 and 452 according to the user information received from the information presenting terminal 410 and for transmitting the information to the client-side information presenting apparatus 410. FIG. 5 shows another configuration of the information providing system in which the provider 451 is connected to the information center-side information selection apparatus 430 through the Internet 440. In this connection, the provider 451 may be located in the information center-side information selection apparatus 430. An external content provider 451 may provide information stored in such a recording medium as a CD-ROM so that the information center-side information selection apparatus 430 uses the information.

Hereinafter, a description will be made for the configuration and the operation of each of the client-side information presenting apparatus 410 and the information center-side information selection apparatus 430 included in the communication type information providing system configured in the first to third embodiments respectively.

Figure 6:
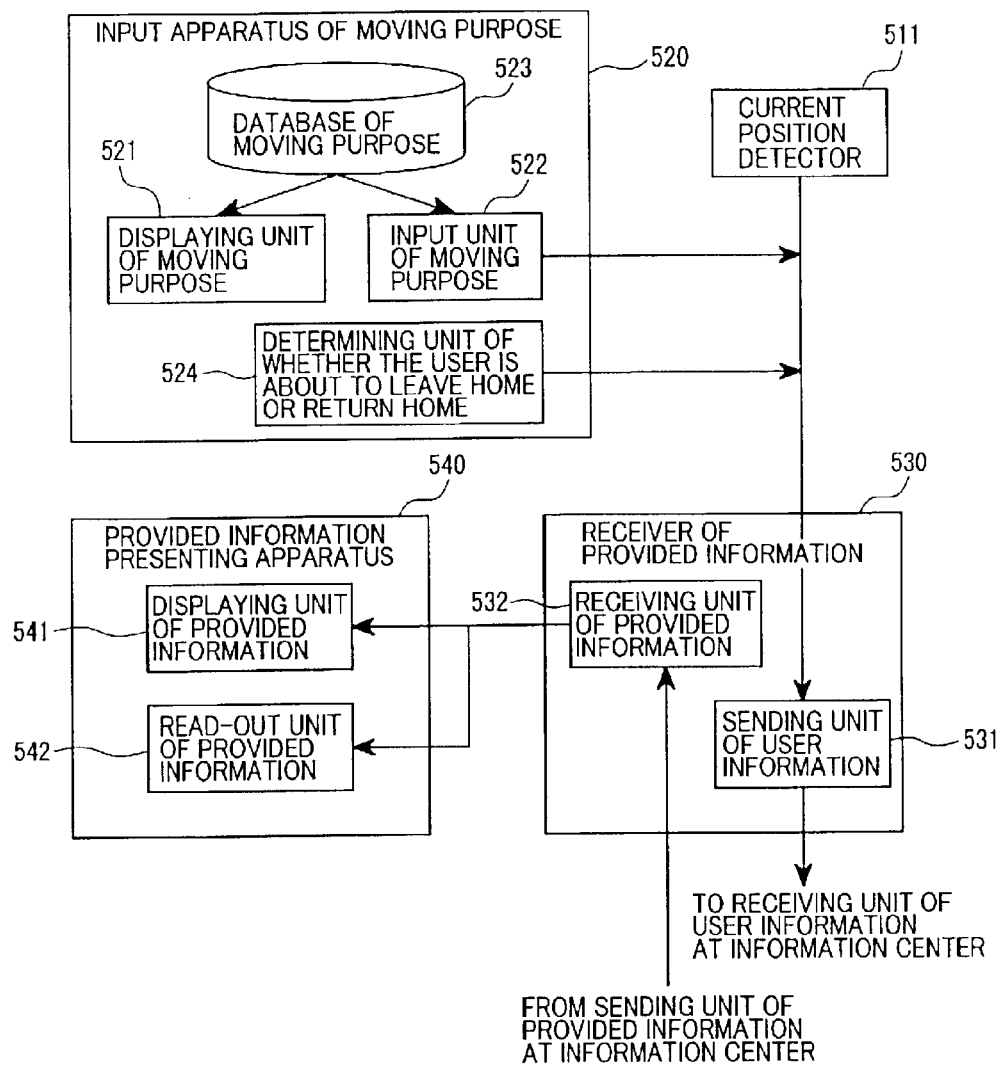
FIG. 6 is a block diagram of a client-side information presenting apparatus employed in the communication type information providing system in the first embodiment of the present invention.

FIG. 6 shows an example of the client-side information presenting apparatus 410 employed in the communication type information providing system configured in the first to third embodiments respectively. In this first embodiment, the client-side information presenting apparatus 410 is configured by a current position detector 511; an input apparatus of moving purpose 520 composed of a displaying unit of moving purpose 521, an input unit of moving purpose 522, a database of moving purpose 523, and a determining unit of whether the user is about to leave home or return home 524; a receiver of provided information 530 composed of a sending unit of provided information 531 and a receiving unit of provided information 532; and a provided information presenting apparatus 540 composed of a displaying unit of provided information 541 and a read-out unit of provided information 542.

At first, the user of this information providing terminal is requested to set his/her destination point. This method can use any of existing techniques employed for car navigation systems, so no detailed description will be made here for the method. Hereunder, it is premised that both starting and destination points are already set using such an existing technique.

The user is then requested to input his/her purpose to move to the destination point from the input apparatus of moving purpose 520. Thus, the input apparatus of moving purpose 520 is started up to prompt the user to input the moving purpose after the destination setting function is started and the destination is set by the user.

This input apparatus of moving purpose 520 is configured by a displaying unit of moving purpose 521, an input unit of moving purpose 522, a database of moving purpose 523, and a determining unit of whether the user is about to leave home or return home 524 as described above.

At first, the input apparatus of moving purpose 520 is started up, then the displaying unit of moving purpose 521 is started up, thereby the client-side information presenting apparatus 410 obtains choices for selecting a moving purpose from the database of moving purpose 523. The database 523 retains data in the format as shown in FIG. 11. Then, the displaying unit of moving purpose 521 displays the moving purpose obtained from the database 523 on a display device such as a liquid crystal display (LCD), CRT, or the like and starts up the input unit of moving purpose 522 to enable the user to input necessary data.

When the input unit of moving purpose 522 is started up, the client-side information presenting apparatus 410 regards an input from an input device such as a button/touch panel as an input signal from a button-on determining device/touch panel input device and make the input correspond to the moving purpose ID inputted by the user.

While the output device in the displaying unit of moving purpose 521 is assumed as a visual display device and the input device in the input unit of moving purpose 522 as a physical input device that uses buttons/touch panel, the device 521 may be replaced with any device for reading out moving purposes with voices and the input unit of moving purpose 522 may be replaced with any device for recognizing inputted voices.

While all the choices for moving purposes obtained from the database of moving purpose 523 are displayed/read out in the above description, it is also possible for the user to communicate with the input apparatus of moving purpose 520 with a voice in accordance with a preset flow to determine the user's moving purpose automatically. For example, the input apparatus of moving purpose 520 may determine a user's moving purpose as "going to work (at a commuting time) if the user answers YES to a question "Are you are going to a certain place to work?" after the destination is set.

Although the choices for all the moving purposes are presented as shown in FIG. 11 and the user is requested to select one of the choices in the above description in this embodiment, this method may be replaced with another in which the choices related to the user's going to work is presented with priority if it is determined automatically that the current position of the user is his/her home and the destination is an office to which the user commutes every day while the input apparatus of moving apparatus 520 determines whether or not the user has some time to spare for the moving and selects the moving purpose ID automatically without presenting any choice to the user if the target arrival time at the destination is set.

The moving purpose ID inputted as described above is passed to the receiver of provided information 530 so as to be transmitted to the information center.

On the other hand, the determining unit of whether the user is about to leave home or return home 524 is started up to determine whether the route used by the user is for "leaving home" or "returning home". Although various methods are available to determine "leaving home"/"returning home", the most simple method for the determination is to determine as "leaving home" if the current position of the user is "home" and as "returning home" if the destination is "home". Usually, each car navigation system requests the user to set "home" related information to be used for the above determination.

Figures 7, 8:
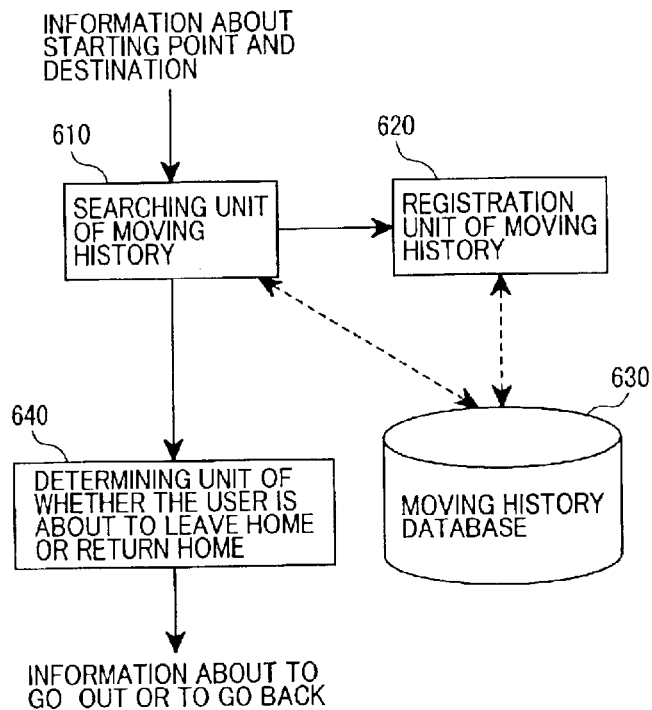
FIG. 7 is a block diagram of a determining unit of whether the user is about to leave home or return home employed in the communication type information providing system in the first embodiment of the present invention.
FIG. 8 is a structure of moving history data used in the determining unit of whether the user is about to leave home or return home in the first embodiment of the present invention.
Figures 9, 10:
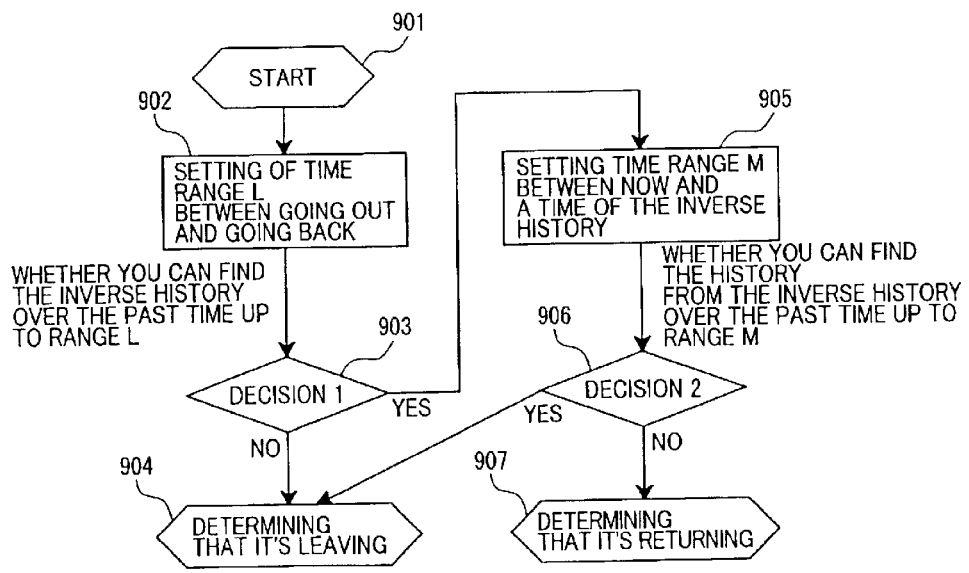
FIG. 9 is an example of moving history data searched by the determining unit of whether the user is about to leave home or return home in the first embodiment of the present invention.
FIG. 10 is an example of an algorithm used for determining whether the user is about to leave home or return home in the first embodiment of the present invention.

Next, a description will be made for a method further enhanced so as to determine "leaving home" and "returning home" with reference to FIG. 7. This determining unit of whether the user is about to leave home or return home 524 is configured by a searching unit of moving history 610, a registration unit of moving history 620, a moving history database 630, and a determining unit of whether the user is about to leave home or return home 640. The starting and destination points of a route, for example, the points inputted as described above, are passed to the searching unit of moving history 610. The searching unit of moving history 610 then refers to the moving history database 630 to search both the same/reverse history data as/of the pair of the current starting and destination points. In other words, data for denoting A as the starting point and B as the destination point and B as the starting point and A as the destination point is searched in the moving history data stored in the moving history database 630. Hereinafter, the former pair will be referred to as forward history and the latter pair as reverse history. FIG. 8 shows a structure of data stored in the moving history database 630 and FIG. 9 shows an example of moving history data searched by the searching unit of moving history 610 when the starting point is "home" and the destination point is "a certain supermarket". The moving history data searched by the searching unit of moving history 610 as described above is passed to the determining unit of whether the user is about to leave home or return home 640. On the other hand, the starting point/destination information inputted after the searching by the searching unit of moving history 610 is passed to the registration unit of moving history 620 and registered as new moving history data in the moving history database 630. The determining unit of whether the user is about to leave home or return home 640 thus determines whether the inputted pair of starting and destination points is "leaving home" or "returning home" according to the moving history data searched by the searching unit of moving history 610. FIG. 10 shows an example of such a determining algorithm. This algorithm determines a user movement as "leaving home" if there is no reverse history data found for a fixed period in the past from the current time as a result of the searching by the searching unit of moving history 610 (determination 1). If there is some reverse history data found and there is some forward history data at shorter intervals in the past of the reverse history data, the user's movement is determined as "leaving home" (determination 2). In any other cases, the user's movement is determined as "returning home" (determination 2). For example, if the current time is "September 27, 19:00" and moving history data shown in FIG. 9 is searched, the maximum interval L between leaving and returning is set as 2 days in step 902. This interval determination is to be made within an interval of 48 hours between "leaving" and "returning". And, because the last history data as shown in FIG. 9 is found and the data denotes 2 days in the past from the current time, the determination 1 becomes YES. Then, the data that denotes "one day and 23 hours and 30 minutes" is set for M (interval between the current time and the (reverse) moving history data in step 905. In the determination 2, it is checked whether or not there is any forward history data between the last history data shown in FIG. 9 and the data obtained within M in the past. The first data shown in FIG. 9 is assumed as forward history data and the result of the determination 2 becomes YES, so that the current moving from "home" to "a certain supermarket" is determined as "leaving home". The "leaving home/returning home" information determined as described above is passed to the receiver of provided information 530 so as to be transmitted to the information center.

The route guiding method in this embodiment is similar to those employed for existing car navigation systems, so no detailed description will be made for the method here. In place of the route guiding method, another method may be used; for example, only the current position of the user is tracked. In this connection, the information providing terminal comes to have a function for providing only the new information related to the route on which the user is moving currently.

When the user begins moving, thereafter, the receiver of provided information 530 is started up periodically at fixed time intervals or each time the user moves a certain distance. This time interval may be preset in the receiver of provided information 530 or specified by the information center.

This receiver of provided information 530 is configured by a sending unit of provided information 531 and a receiving unit of provided information 532.

When the receiver of provided information 530 is started up as described above, the sending unit of provided information 531 is also started up together with the current position detector 511 to obtain the current position of the user.

This current position detector 511 detects the current position of the user who carries this information providing apparatus with him/her. For example, the current position detector 511 may employ a latitude/longitude measuring method that uses the GPS (Global Positioning System) or position detecting method that employs the triangulation performed among a plurality of base stations, realized for PHS and CDMA telephones. The current position of the client-side information presenting apparatus detected by this current position detector 511 is passed to the receiver of provided information 530 so as to be transmitted to the information center.

The sending unit of provided information 531 then transmits the user information to the information center. The user information is composed of the starting and destination points, the current position received from the current position detector 511, the moving purpose ID received from the input apparatus of moving purpose 520, and the authentication information such as the member number of the user.

Then, the receiver of provided information 530 starts up the receiving unit of provided information 532 and waits for provided information to be received from the information center. Receiving the information, the receiving unit of provided information 532 passes the information to the provided information presenting apparatus 540.

The communication method employed by the receiver of provided information 530 may be any for the packet data communication functions of portable telephones and wireless LAN techniques.

When the provided information presenting apparatus 540 is started up, the receiver of provided information 530 selects the information to be displayed and the information to be read out from the received information so as to be passed to the displaying unit of provided information 541 and the read-out unit of provided information 542 respectively. The displaying unit of provided information 541 may be any of a liquid crystal display (LCD), a CRT, etc. In addition, any of such printing devices as printers may be employed as an output device. On the other hand, the read-out unit of provided information 542 may be any of voice reproducing devices such as a PCM data reproducing device and a voice synthesizing device used to convert read-out texts to voice signals so as to be reproduced as real voices. There have been some examples for such voice synthesizing techniques. For example, a technique disclosed in Chapter 7 of "Digital Voice Processing" (written by Sadahiro Yoshii and published by Tokai University Publishing Association, Sep. 25, 1985).

When the information presentation by the provided information presenting apparatus 540 is terminated as described above, the terminal sleeps for a certain time. At the time for providing another information, the receiver of provided information 530 is started up again to provide the new information.

As described above, the information providing terminal is allowed to display the information related to the route on which the user is moving and selected by the information center or present the information to the user with a voice. At this time, information comes to be selected by the information center in accordance with the moving purpose inputted by the user from his/her terminal.

Figure 12:
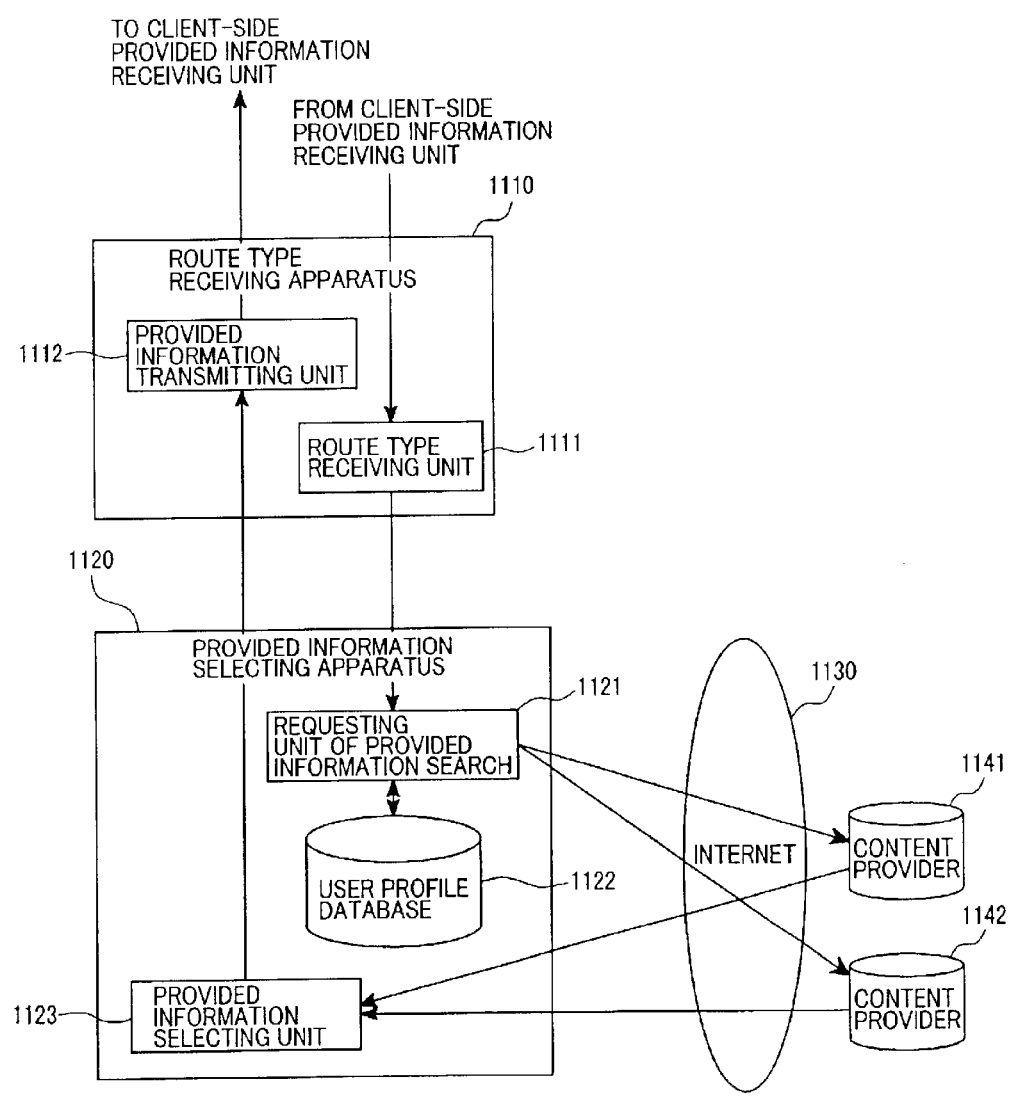
FIG. 12 is a block diagram of an information center-side information presenting apparatus employed in the communication type information providing system in the first embodiment of the present invention.

Next, an example of the information center-side information selection apparatus 430 shown in FIG. 5 will be described. FIG. 12 shows another block diagram of the information center-side information selection apparatus 430 shown in FIG. 5. This information center-side provided information selection apparatus 430 is configured by a route type receiving apparatus 1110 composed of a provided information receiving unit 1111 and a provided information transmitting unit 1112; and a provided information selecting unit 1120 composed of a requesting unit of provided information search 1121, a profile database 1122, and a provided information selecting unit 1123; and the Internet 1130; and a content providers 1141 and 1142.

The provided information receiving unit 1111 waits for user information to be received from the information providing terminal of one of the members of the information center. When receiving user information from such an information providing terminal, the provided information receiving unit 1111 passes the information to the requesting unit of provided information search 1121.

When the requesting unit of provided information search 1121 is started up, the provided information receiving unit 1111 refers to the profile database 1122 to obtain the user profile data corresponding to his/her authentication information. This user profile information may include such personal information items as sex, age, occupation, hobby, etc., as well as provided information history, visited spot history, etc. Then, the moving purpose ID and the current position information are extracted from the user profile data and the received user information and transmitted to the content provider 1141 and/or 1142 through the Internet 1130 to request searching of desired provided information. In this embodiment, although each content provider is expected not to be the information center manager, the content provider may have one or more information databases in the information center and uses those databases as content providers, of course. Such a content provider may also be selected beforehand according to the user profile data, the moving purpose ID, and the current position information so that only the selected provider is requested to search information to be provided to the user.

Figure 13:
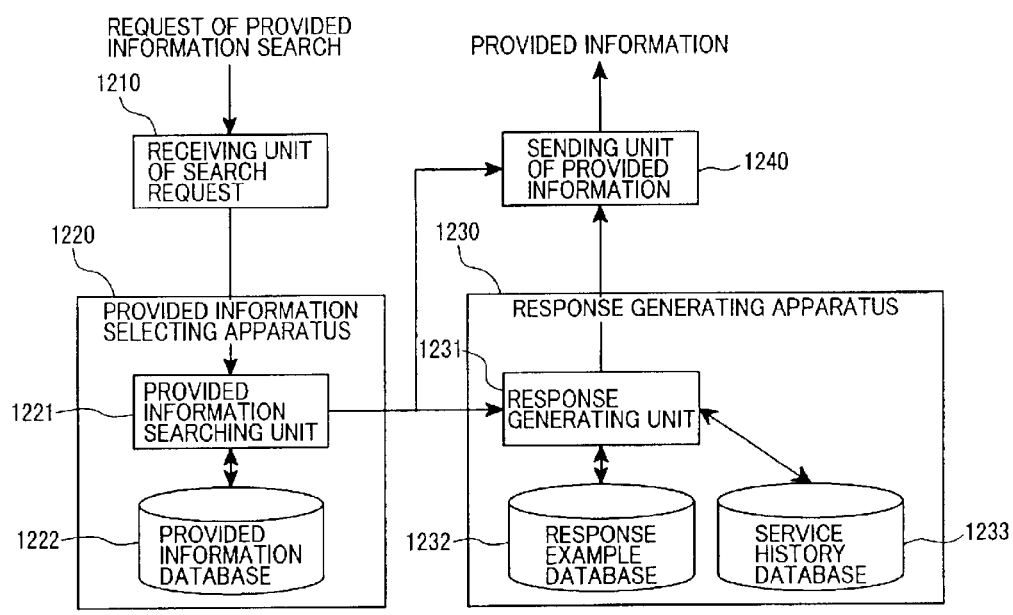
FIG. 13 is a block diagram of a content provider-side information selecting apparatus employed in the communication type information providing system in the first embodiment of the present invention.

The content provider 1141 narrows and selects information to be provided to the user according to the route on which the user is moving and the user's moving purpose. For example, assume now that the content provider 1141 is a bookshop. The provider 1141 lists up books the user seems to like according to the user profile information, then selects business books if the moving purpose is "commuting (going to work)" and hobby-related books and children books if the moving purpose is "leisure (with children)" with priority. Thus, the user comes to be provided with more proper information according to his/her moving purpose. FIG. 13 shows an example of such a processing for selecting information to be provided. FIG. 14 shows a structure of the data included in the information to be provided stored in the provided information database 1222 shown in FIG. 13. The provided information selection apparatus 1120 used in each content provider is configured, for example, by a receiving unit of search request 1210; a provided information selecting apparatus 1220 composed of a provided information searching unit 1221 and a provided information database 1222; a response generating apparatus 1230 composed of a response generating unit 1231, a response example database 1232, and a service history database 1233; and a sending unit of provided information 1240. An information searching request for requesting searching of information to be provided, which is received from the information center through the Internet 1130, is received by the receiving unit of search request 1210, then passed to the provided information selecting apparatus 1220. The provided information selecting apparatus 1220 thus searches the information, which matches with the user information items of sex, age, occupation, hobby, and moving purpose included in the request information received from the provided information database 1222. The searched information is transmitted to the information center through the sending unit of provided information 1240 or response generating apparatus 1230 so that the expression of the information to be provided is corrected according to the user. For example, for a user having registered user profile information items of "male, 40s (age), company employee, fishing, commuting (going to work)", the information to be provided matches with the content ID "1234" shown in FIG. 14, thereby the information ("Business Model" This book has been published . . . ) is output to the user. This information is then transmitted to the response generating apparatus 1230, then the service history database 1233 is checked. If the user's moving history that records the user's visiting to this bookshop last week is searched, a preset message "Thank you for visiting our shop" is searched from the response example database 1232 and corrected so as to be added to the start of the above information to be provided. Finally, the content provider 1141 transmits the information selected and corrected as described above to the provided information selecting unit 1123 located in the provided information selecting unit 1120.

When the provided information selecting unit 1123 is started up, the information center-side information selection apparatus 430 selects further the provided information received from one of the providers 1141 and transmits the information to the user's information providing terminal through the provided information transmitting unit 1112 located in the route type receiving apparatus 1110. This provided information selecting unit 1123 can select provided information in various ways, for example, 1) selecting information received from a content provider closer to the current position of the user, 2) selecting information related to the information provided last time, and 3) selecting information matching more with the moving history records of the user's visiting spots so far.

The user of the information providing terminal of the present invention thus comes to be presented with proper information on the route on which the user is moving. In addition, if the moving purpose differs from the last one while the user moves on the same route, the user comes to receive different information.

For example, assume now that the user is moving to go to work in the above example. At first, the user inputs both starting and destination points, as well as the moving purpose from his/her information providing terminal. It is premised here that the user's moving purpose is "going to work with some time to spare". As a result, when the user passes in front of a bookshop on the route, the information center requests the content provider that manages the bookshop to provide the user with the shop information. The provider then provides the user with proper information during the commuting time according to the taste and the moving purpose of the user; the information may be provided together with a long message like "(How to Patent Business Models) has been published".

On the other hand, if the user selects a moving purpose "leisure (sports)" while the user is going on the same route to go to the company's sports facility on a holiday, the user comes to be provided with sports-related magazine information according to the user's taste "sports" upon passing in front of the bookshop.

Second Embodiment

Next, a description will be made for the second embodiment of the present invention, which is a variation of the first embodiment. In this second embodiment, the user is not requested to input any information from his/her terminal and the server-side route type determining apparatus determines the user's moving purpose automatically.

The configuration of the information providing system in this second embodiment is the same as that shown in FIG. 5. Hereunder, the operation of each of the client-side information presenting apparatus 410 and the information center-side information selection apparatus 430 will be described with reference to some examples.

Figure 15:
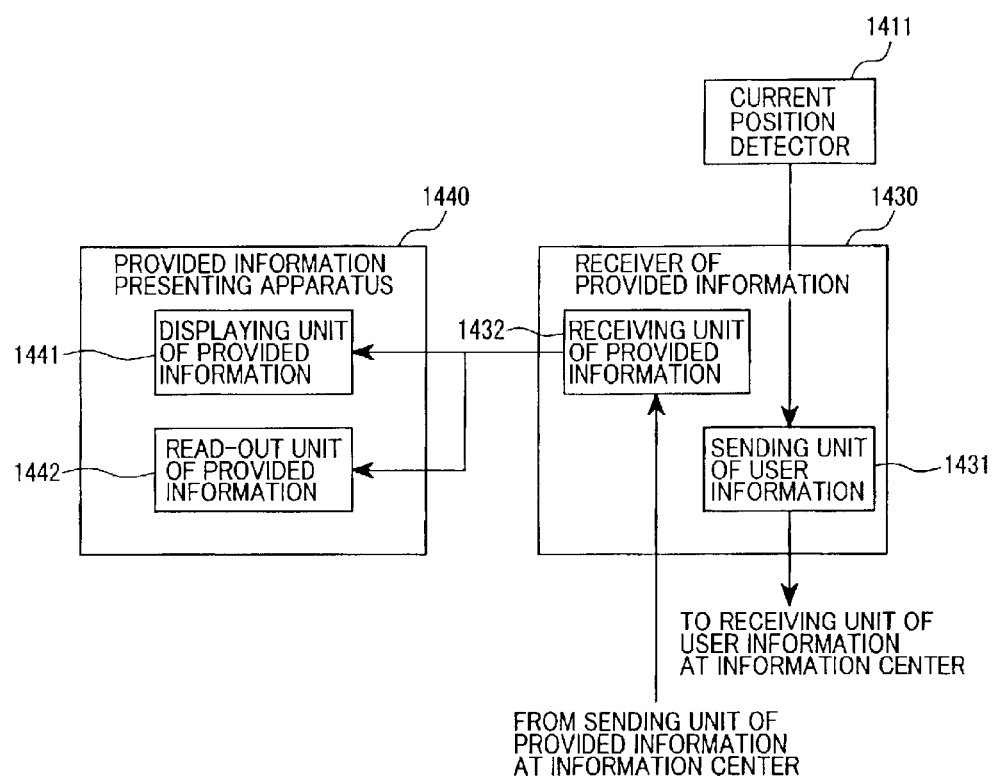
FIG. 15 is a block diagram of a client-side information presenting apparatus employed in the communication type information providing system in the second embodiment of the present invention.

FIG. 15 shows an example of the client-side information presenting apparatus 410 employed in the communication type information providing system configured as described in the first to third embodiments of the present invention. In this second embodiment, the client-side information providing apparatus 1141 is configured by a current position detecting apparatus 1411; a provided information receiving apparatus 1430 composed of a user information sending unit 1431 and a provided information receiving unit 1432; and a provided information presenting apparatus 1440 composed of a provided information displaying unit 1441 and a readout unit of provided information 1442. Each of those components has the same function as the corresponding one in FIG. 6, so detailed description for them will be omitted here.

This client-side information providing terminal 410 repeats a series of processings for presenting provided information to the user using the provided information presenting apparatus 1440 while the provided information receiving apparatus 1430 that is started up periodically transmits user information items of both starting and destination points, current position, and authentication information to the information center and receives information to be presented to the user from the information center.

Figure 16:
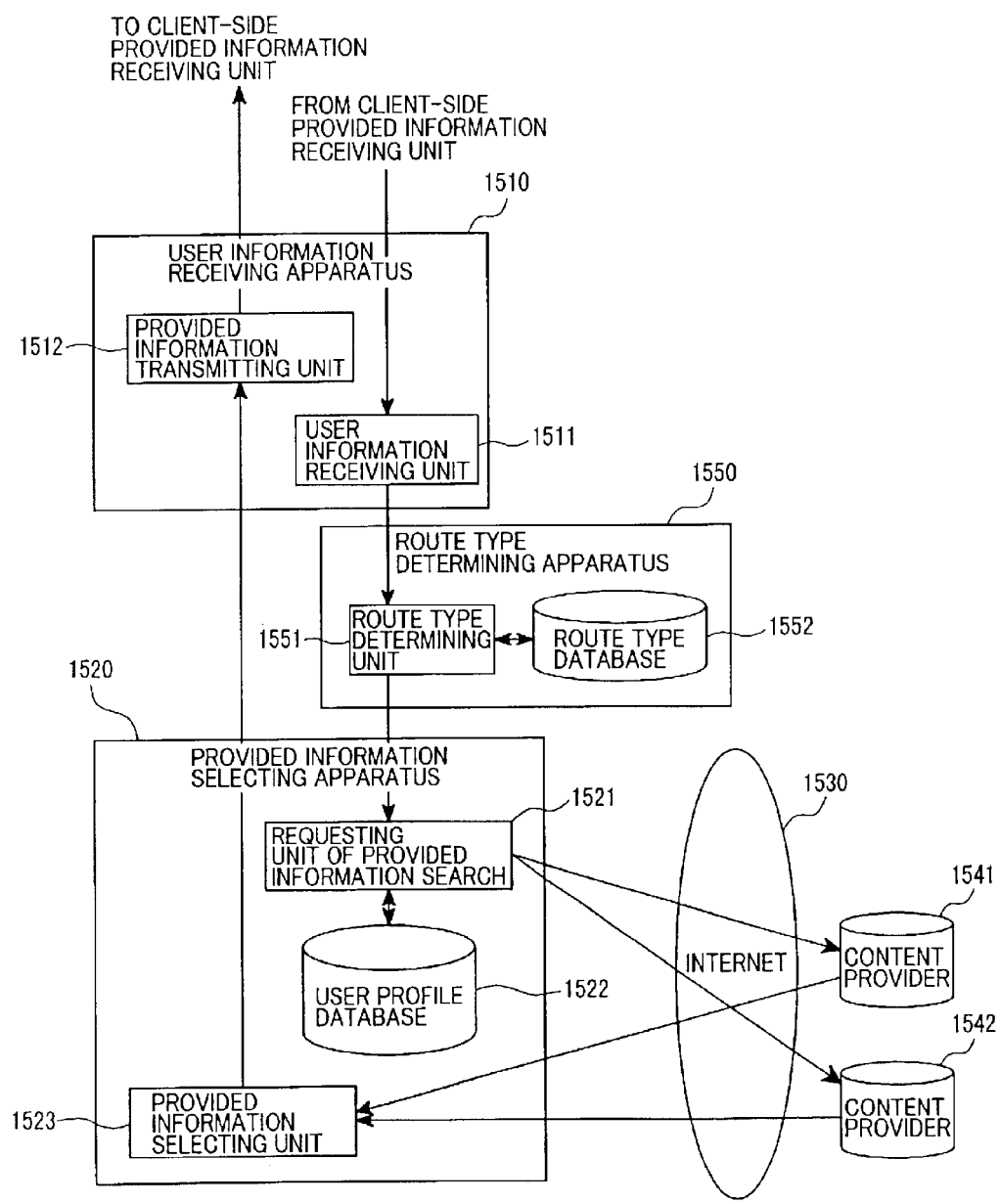
FIG. 16 is a block diagram of an information center-side information presenting apparatus employed in the communication type information providing system in the second embodiment of the present invention.

Next, a description will be made for another example of the information center-side information selection apparatus 430 shown in FIG. 5. FIG. 16 shows an example of the information center-side information selection apparatus 430 shown in FIG. 5. This information center-side information selection apparatus 430 is configured by a user information receiving apparatus 1510 composed of a user information receiving unit 1511 and a provided information transmitting unit 1512; a provided information selecting apparatus 1520 composed of a requesting unit of provided information search 1521, a user profile database 1522, and a provided information selecting unit 1523; the Internet 1530; and content providers 1541 and 1542; and a route type determining apparatus 1550 composed of a route type determining unit 1551 and a route type database 1552.

The user information receiving unit 1511 waits for user information to be received from the information providing terminal of one of the members of the information center. When receiving user information from such an information providing terminal, the user information receiving unit 1511 passes the information to the route type determining apparatus 1550.

The route type determining apparatus 1550 then starts up the route type determining unit 1551 and refers to the information stored in the route type database 1552 according to such user information items as current position, both starting and destination points, and current time written in the user information received from the user information receiving unit 1511 to determine the route type that denotes the user's moving purpose, then passes the determined route type to the provided information selecting apparatus 1520.

In this connection, the methods described in the first embodiment are usable as a method for enabling the provided information selecting apparatus 1520 to request the content provider 1541 to search information, as well as a method for enabling the provided information selecting unit 1523 to select information obtained from the content provider 1541 to transmit the selected information to the user's information providing terminal through the requesting unit of provided information search 1521.

Next, a description will be made for a method for enabling the route type determining apparatus 1550 to determine a moving purpose of a user.

The route type determining apparatus 1550, when receiving the current position of the user from the user information receiving unit 1511, starts up the route type determining unit 1551 first of all. The route type determining unit 1551 then refers to the information stored in the route type database 1552 according to the information items of position information, both starting and destination points, current time, etc. received from the user information receiving unit 1511 to identify the route type that denotes the user's moving purpose.

The route type database 1552 is structured, for example, as shown in FIG. 17. The route type determining unit 1551, when receiving both starting and destination points of the user from the user information receiving unit 1511, searches the route type data matching most with the three data items (starting point, destination point, and clock time) plus the clock time (with the day of the week) at that time from the route type database 1552.

Figure 18:
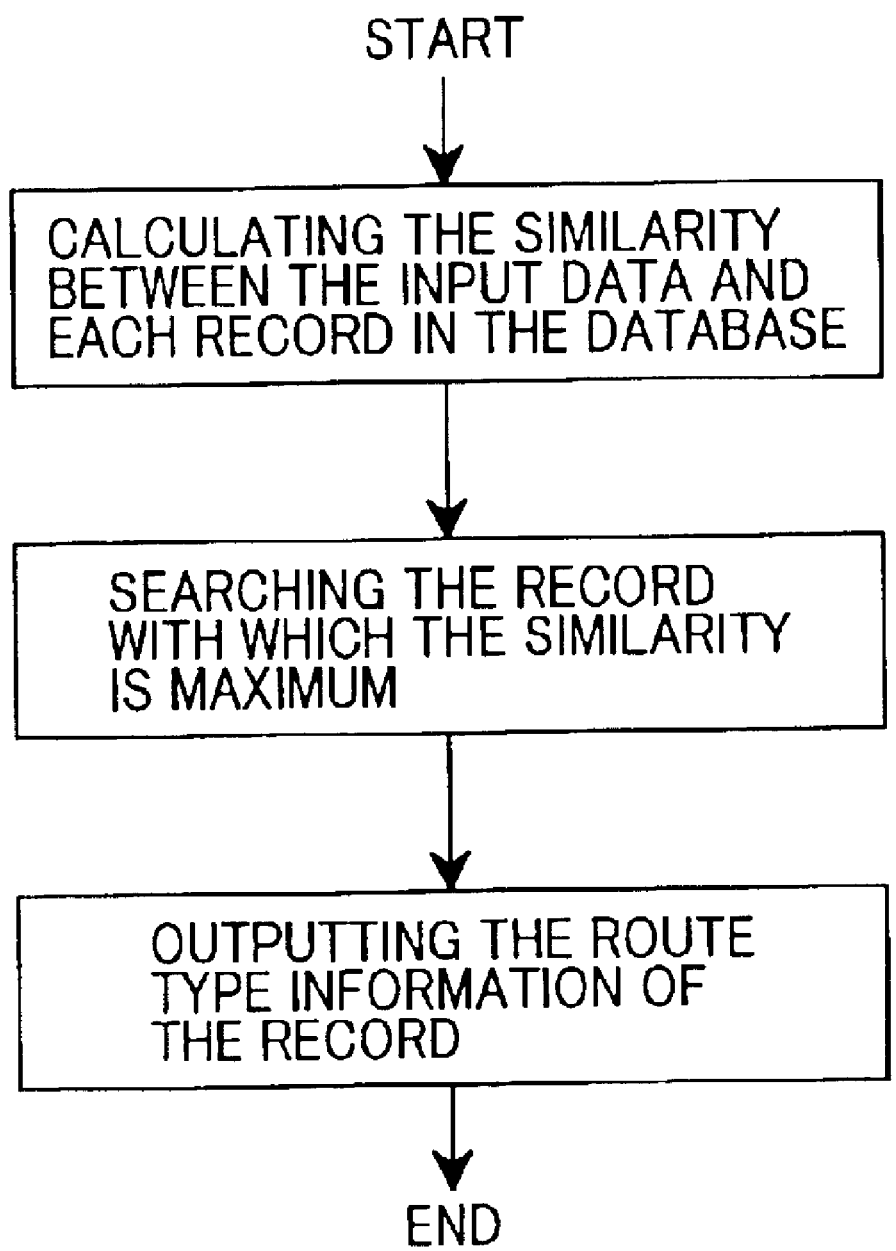
FIG. 18 is a flowchart for searching route type data in a route type determining unit employed in the second embodiment of the present invention.

The method described with reference to FIG. 18 may be employed at that time. At first, the similarity between the data (starting point, destination point, and clock time) inputted in step 1 and each record in the route type database 1552 is calculated. A value 100 is added to the result of this calculation of similarity if both data items match with each other completely. If not, the tables shown in FIGS. 19 and 20 are referred so that a proper similarity value found in those tables is added to the calculation result so as to calculate the similarity of each record. In FIGS. 19 and 20, "* Inc." denotes that both data items match with each other even if any character string is written in the "*" portion. "Mon. to Fri. 7:00~9:00" denotes that both data items match with each other if the specified time is within that range. In step 2, the highest similarity is searched from among the similarity values added to all the records. To make this searching, found similarity values may be sorted or the highest similarity value and the recorded information having the highest similarity may be updated as a result of each comparison with the maximum similarity to be found when the similarity of each record is found in step 1. In step 3, the route type information of the record that is to have the maximum similarity is output.

The route type determining apparatus 1550 determines a route type that denotes a user's moving purpose such way.

Third Embodiment

Next, the third embodiment of the present invention will be described. While each route type is determined in the information center in the second embodiment, the determination is done in the client-side terminal in this third embodiment. In addition, each route type is identified interactively at the client-side terminal in this third embodiment, although it is impossible in the second embodiment.

Also in this embodiment, the configuration of the information providing system is the same as that shown in FIG. 5. Hereunder, the operations of the client-side information presenting apparatus 410 and the information center-side information selection apparatus 430 will be described with reference to some examples.

Figure 21:
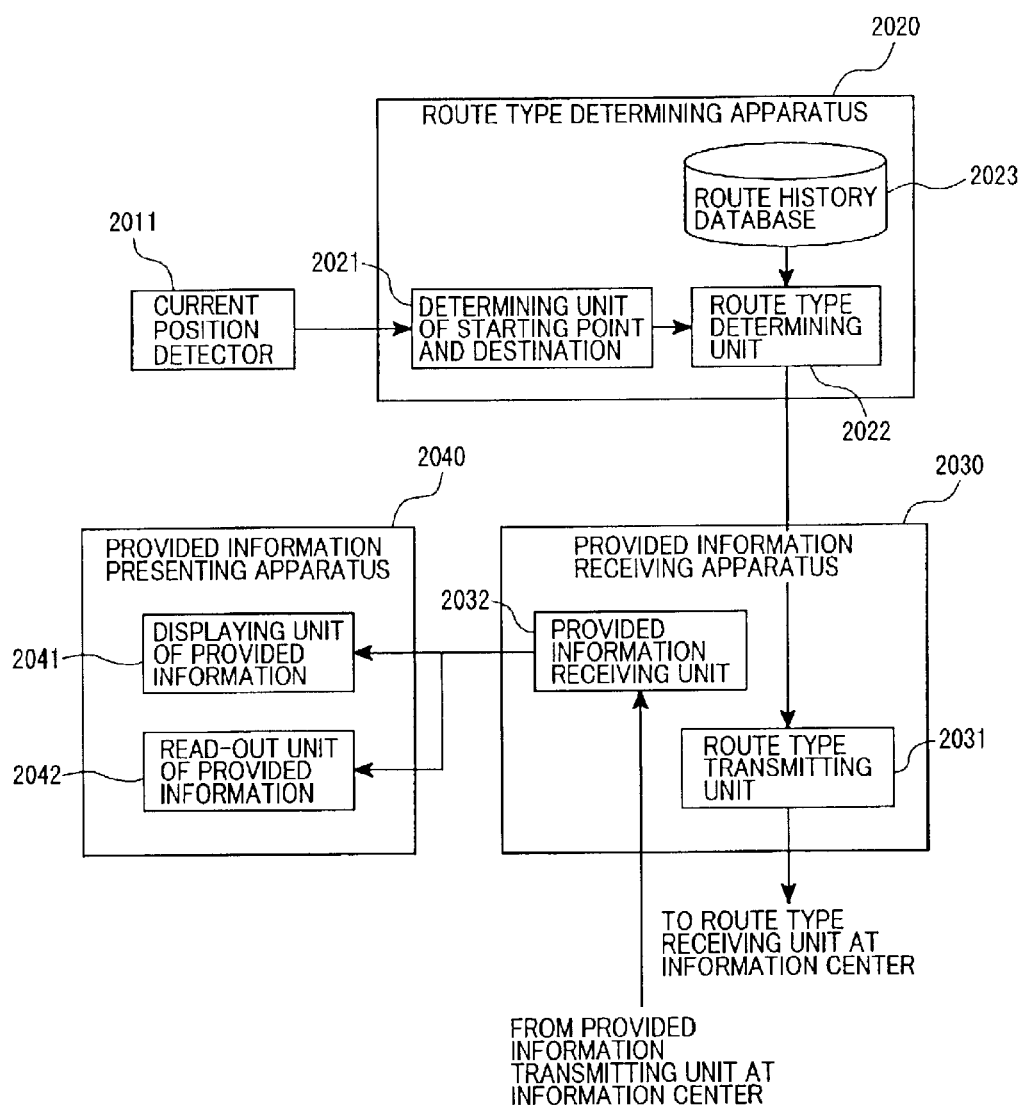
FIG. 21 is a block diagram of a client-side information presenting apparatus employed in the communication type information providing system in the third embodiment of the present invention.

FIG. 21 shows a block diagram of the client-side information presenting apparatus 410 employed in the communication type information providing system described in the first to third embodiments of the present invention respectively. The client-side information providing apparatus 410 in this third embodiment is configured by a current position detecting apparatus 2011; a route type determining apparatus 2020 composed of a determining unit of starting point and destination 2021, a route type determining unit 2022, and a route history database 2023; a provided information receiving apparatus 2030 composed of a route type transmitting unit 2031 and a provided information receiving unit 2032; and a provided information presenting apparatus 2040 composed of a provided information displaying unit 2041 and a read-out unit of provided information 2042. These components have the same functions as those of the corresponding components shown in FIG. 6, so detailed description for them will be omitted here.

This client-side information presenting apparatus 410 transmits user information composed of the current position of the user detected by the current position detecting apparatus 2011, the route type information that denotes the user's purpose for moving determined by the route type determining apparatus 2020 according to the current position information, and the user's authentication information to the information center respectively, then receives information to be provided to the user from the information center. After that, the apparatus 410 repeats a series of processings for presenting provided information to the user using the provided information presenting apparatus 2040.

Next, the operation of the route type determining apparatus 2020 will be described. The provided information receiving apparatus 2030 is started up periodically to start up the current position detecting apparatus 2011 first so as to detect the current position of the client-side terminal. The detected current position is passed to the route type determining apparatus 2020, thereby the route type is determined there according to the received current position.

The route type determining apparatus 2020, when receiving the current position from the current position detecting apparatus 2011, starts up the determining unit of starting point and destination 2021. The determining unit of starting point and destination 2021 then determines both starting and destination points of the user according to the position information received from the current position detecting apparatus 2011. The most simple method for such determination employed for a car navigation system is to use both starting and destination points set for the route guidance function of the car navigation system. For systems other than those car navigation systems, as well as even for car navigation systems, if none of starting and destination points is set therein, the starting and destination points can be obtained using a method to be described later. The starting and destination points determined by the determining unit of starting point and destination 2021 are passed to the route type determining unit 2022.

The route type determining unit 2022 then refers to the information in the route history database 2023 to convert the starting and destination points to route type information. The route history database 2023 is structured, for example, as shown in FIG. 17. The method used in the route type determining unit 1551 is usable as is for this conversion of both starting and destination points to route type information in the route history database 2023.

When this client-side apparatus 410 is used for the first time, that is, when the target route history data is not found in the route history database 2023, the following method is used to display necessary information or prompt the user to specify the current route type or transmit the above data (starting and destination points and clock time) to the information center so that the same route history data of another user stored in the information center is used for the above searching. (This method is referred to as a substitution method.)

Next, a description will be made for such a substitution method employed when the determining unit of starting point and destination 2021 is difficult to determine starting and destination points. In this connection, the route type determining apparatus 2020 shown in FIG. 21 is replaced with a similar provided information receiving apparatus 2030 shown in FIG. 22.

This substituted apparatus 2030 is configured by a processing unit of route type determining dialog 2110, a dialog script database 2120, a route type determining unit 2130, and a route history database 2140.

Figures 22, 23:
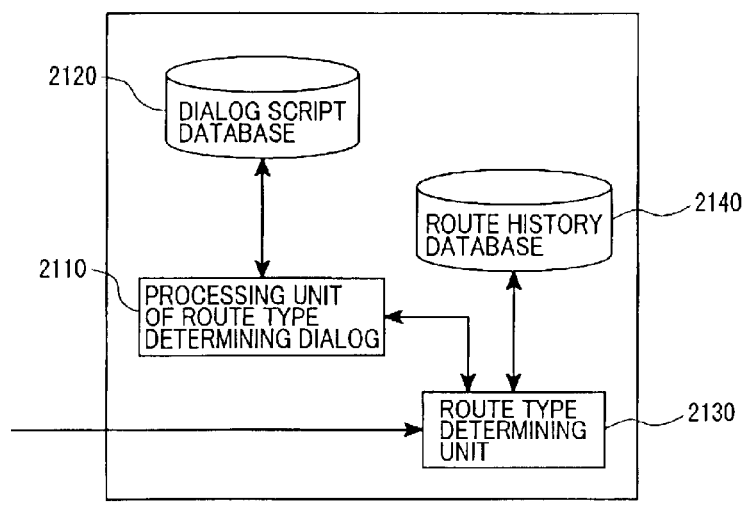
FIG. 22 is an example of substitution of a starting point/destination point determining unit employed in the communication type information providing system in the third embodiment of the present invention.
FIG. 23 is a structure of route history data used in the third embodiment of the present invention.

The route type determining unit 2130 searches the route history data closest to the current position received from the current position detecting apparatus 2011 shown in FIG. 21 from the route history database 2140. The route history database 2140 is structured, for example, as shown in FIG. 23. The route type determining unit 2130 compares inputted position information with the information set in the position field 2210 to calculate the similarity with the inputted data with respect to each record. This similarity may be, for example, a reciprocal number of a Euclidean distance between positions. The route type determining unit 2130 outputs the route type data of a record having the highest similarity.

However, if the similarity is under a preset value, the processing unit of route type determining dialog 2110 is started up. The processing unit of route type determining dialog 2110 thus refers to the dialog script database 2120 to execute an interactive task for identifying the route type. This interactive processing uses, for example, the VoiceXML standard regulated by the W3C (World Wide Web Consortium) to use VoiceXML data as an interactive script so as to enable the processing unit of route type determining dialog 2110 that includes a voice recognizer, a voice synthesizer, and a VoiceXML interpreter to execute the interactive script. As a result, some sessions of questions and answers like "Good morning, are you going to go to work?, now" are repeated to identify the subject route type.

Figure 24:
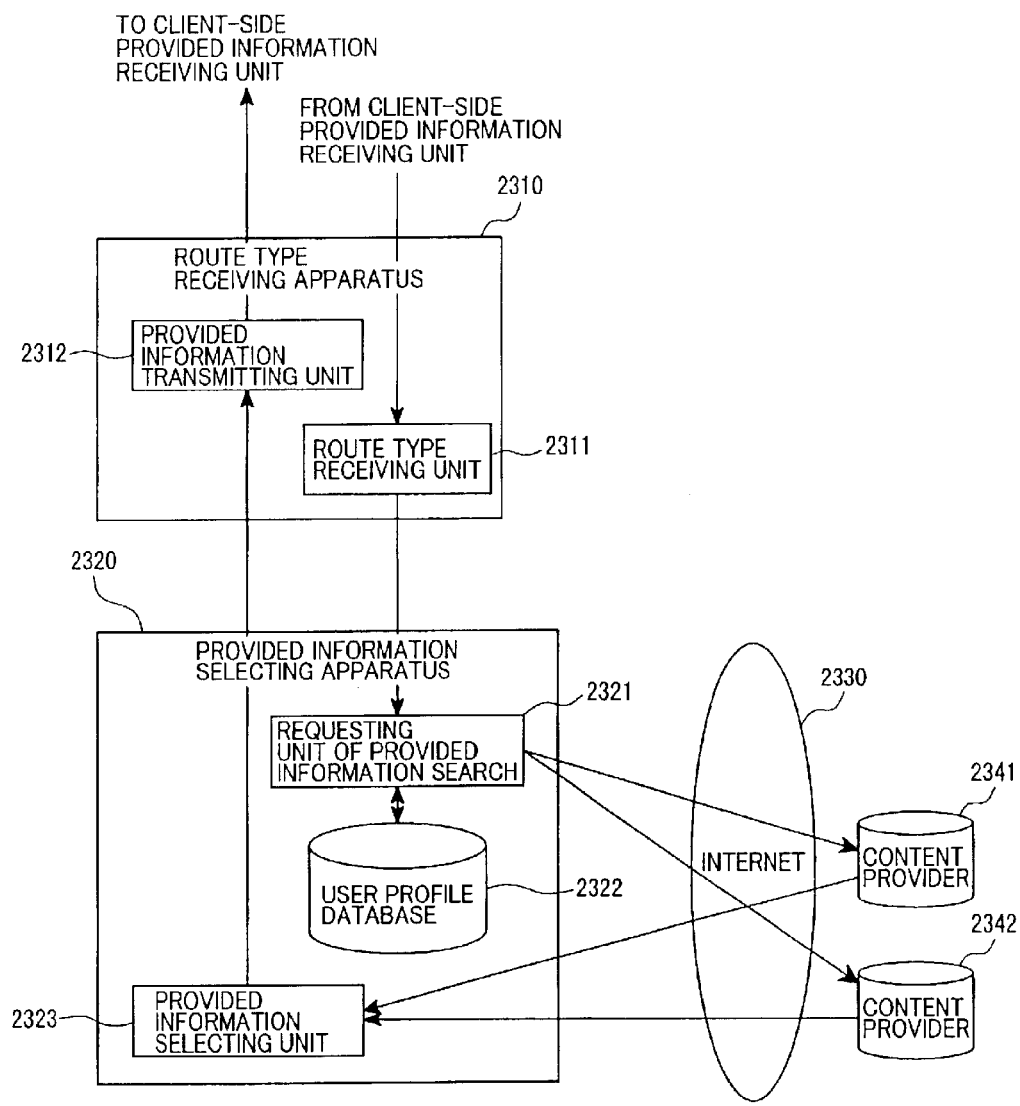
FIG. 24 is a block diagram of an information center-side information presenting apparatus employed in the communication type information providing system in the third embodiment of the present invention.

In this embodiment, the information center is configured as shown in FIG. 24, so that the route type determining apparatus 1550 used in the second embodiment is not needed. And, the configuration of the third embodiment is the same as that of the second embodiment except for the omission of the route type determining apparatus 1550.

Thus, no description will be made here for the operation of the information center in this third embodiment.

Fourth Embodiment

Next, the fourth embodiment of the present invention will be described. In the fourth embodiment, no communication is made with external. The information providing terminal carried by the user with him/her works independently and the user's terminal also functions as the information center in the first to third embodiments described above.

Figure 25:
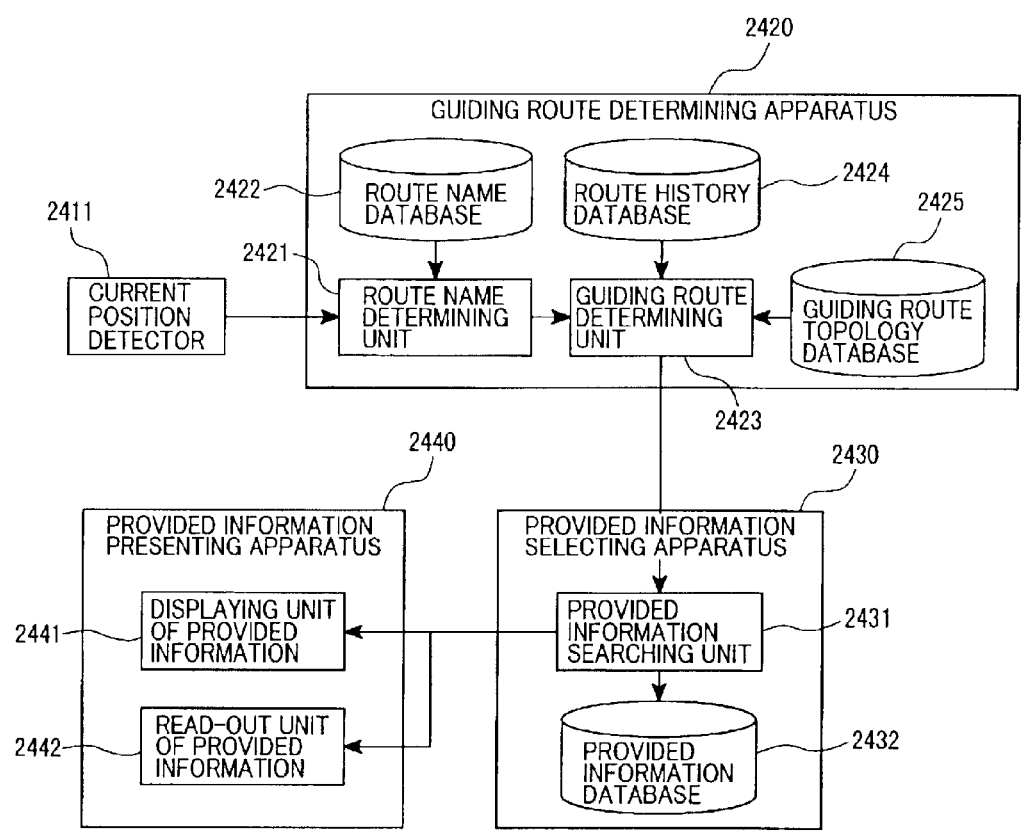
FIG. 25 is a block diagram of an information providing terminal in the fourth embodiment of the present invention.

FIG. 25 shows a block diagram of an information providing terminal in the fourth embodiment of the present invention. This configuration of the user's terminal is the most simple to realize the present invention. For example, this configuration may apply to systems connected to a portable telephone respectively so that the user, who is moving on a specific route in an area, is explained about the near-by sightseeing spots, as well as smaller systems for guiding exhibited articles in museums.

In this embodiment, the information providing terminal is configured by a current position detecting device 2411; a guiding route determining apparatus 2420 composed of a route name determining unit 2421, a route name database 2422, a guiding route determining unit 2423, a route history database 2424, a guiding route topology database 2425; a provided information selecting apparatus 2430 composed of a provided information searching unit 2431 and a provided information database 2432; and a provided information presenting apparatus 2440 composed of a displaying unit of provided information 2441 and a read-out unit of provided information 2442.

The current position detecting device 2411 detects a position of the user who carries the information providing terminal with him/her. The current position detecting device 2411 may use, for example, a latitude/longitude measuring method that uses the GPS (Global Positioning System) or position detecting method that employs the triangulation performed among a plurality of base stations realized for PHS and CDMA method telephones, etc. If this terminal applies to an exhibition guidance system in a museum, the position of the user is identified using a plurality of radio-wave or infrared ray ejectors and further such an apparatus as a wireless LAN for transmitting encoded room numbers installed in each room. The position information output from those position detection units will become a variety of information items such as latitude/longitude information, a relative position denoted by the number of a base station and the base station or a room number and relative coordinate data. The conversion between those items is easy, so the following description will be made by assuming that those position detection units are used to detect the current position of the user as latitude and longitude data, although the generality of those units is not lost. The current position of the user detected by the current position detecting device 2411 such way is transmitted to the guiding route determining apparatus 2420.

The guiding route determining apparatus 2420 is configured by a route name determining unit 2421, a route name database 2422, a guiding route determining unit 2423, a route history database 2424, and a guiding route topology database 2425.

The route name determining unit 2421 refers to the route name database 2422 that stores a correspondence table used for converting position information (latitude and longitude) received from the current position detecting device 2411 to corresponding route information so as to determine a concrete route that includes the position detected by the current position detecting device 2411.

The route name database 2422 has contents, for example, as shown in FIG. 26. If the position information received from the current position detecting device 2411 is within a preset error range from a line between the starting and ending points of this table, the route name database 2422 outputs the corresponding route name to the guiding route determining unit 2423. For example, if inputted position information is (42.15, 142.02), this position information is found to be on a segment of a line (42.11, 141.98).(42.18, 142.05) as a result of sequential comparison with the data stored in the route name database 2422. The position is thus determined to be on the road 2, thereby the information "road 2" is output. This method is the most simple one and effective for such small information providing systems as exhibition guiding systems employed in museums. For wider ranged areas, however, another method is usable. The method tracks the current position of the user by narrowing movable places in a map. This method is employed for car navigation systems in recent years.

The guiding route determining unit 2423 refers to the route history database 2424 for retaining historical information of each route on which the user has moved so far and the guiding route topology database 2425 for retaining information that denotes the roads having been used by the user sequentially as a list of roads, thereby determining the route type with respect to each route name received from the route name determining unit 2421.

The route history database 2424 has contents, for example, as shown in FIG. 27. This database 2424 compares the route name, the position information, and the current time of the user with those received from the route name determining unit 2421 and the current position detecting device 2411, as well as those stored as the previous history data so as to record whether the user is moving in the forward or backward direction.

The guiding route topology database 2425 has contents, for example, as shown in FIG. 28. This database 2425 retains defined data of an area in which the user is provided with information, a guiding route for appreciating exhibition articles.

The guiding route determining unit 2423, when receiving a current route name from the route name determining unit 2421, adds the route information to the route history database 2424 first, then scans the route history database 2424 thoroughly to extract a list of the roads on which the user has moved so far. At this time, every road on which the user has moved in the backward direction must be deleted from the list of the roads. if the route history data shown in FIG. 27 is found in the list and the roads are extracted from top to bottom, data of "road 3→ road 2" is obtained. Then, this list of roads is compared with that stored in the guiding route topology database 2425 to obtain the corresponding guiding route name. In FIG. 28, the route name "guiding route 2" is determined for the data "road 3→ road 2" described above. The guiding route name determined by the guiding route determining unit 2423 is transmitted to the provided information selecting apparatus 2430.

The provided information selecting apparatus 2430 is configured by a provided information searching unit 2431 and a provided information database 2432.

The provided information searching unit 2431 searches information to be provided to the user on the subject guiding route according to the guiding route name received from the guiding route determining unit 2423 from the provided information database 2432 and passes the obtained information to the provided information presenting apparatus 2440.

The provided information database 2432 has contents, for example, as shown in FIG. 29. The provided information searching unit 2431, when receiving, for example, guiding route information "road 1" from the guiding route determining unit 2423, searches the data in this provided information database 2432 to obtain data to be displayed and data to read out corresponding to the "guiding route 1". The searched data to be displayed such way is passed to the displaying unit of provided information 2441 of the provided information presenting apparatus 2440 while the data to be read out is passed to the read-out unit of provided information 2442 of the provided information presenting apparatus 2440 respectively.

The provided information presenting apparatus 2440 is configured by a displaying unit of provided information 2441 and a read-out unit of provided information 2442.

In this embodiment, although the information providing terminal is expected to have both of the displaying unit of provided information 2441 and the read-out unit of provided information 2442, the terminal may have only one of them according to the application, of course.

The displaying unit of provided information 2441 may be any of devices such as a CRT, a liquid crystal display, and a printer that displays or prints out information. The displaying unit of provided information 2441 displays or prints out display data received from the provided information searching unit 2431 as is.

The read-out unit of provided information 2442 is realized by a voice synthesizing technique. A voice synthesizer receives a text written in Japanese and converts the text to voice waveforms to be reproduced as a voice through a speaker. This voice synthesizing technique has some forms to be realized. For example, one of the techniques is disclosed in Chapter 7 of "Digital Voice Processing" (written by Sadahiro Yoshii, published by Tokai University Publishing Association, Feb. 25, 1985).

The user of the information providing terminal of the present invention thus comes to be presented with proper information on each route on which the user is moving. The user is also provided with different information on the same route if the route is determined to be different from the previous route according to the route history data accumulated so far. For example, in the above embodiment, even when the user is moving on "the road 3", the route type is regarded to be different between when the user has moved like "road 3→ road 2→ road 3" (in this case, the user is determined to be on the "road 1") and when the user has come to "the road 3" for the first time. The user thus comes to be provided different information items as shown in FIG. 29 in those two cases.

As described above, according to the present invention, it is possible to provide the user with proper information in accordance with the moving purpose, thereby the convenience of the user is more improved while the information provider is allowed to transmit information to the user more properly to improve the advertisement effect.

What is claimed is:

1. An information providing system for a mobile object moving with a terminal therealong, said terminal having an input device for a user travelling in the mobile object to input at least one current moving purpose of the user and a display for displaying a searched route to a destination point for the moving purpose, said system comprising:

a receiver for receiving said inputted moving purpose of the user;

a route type determining unit for determining a route type based upon said current moving purpose of the user;

provided information selecting unit for selecting from a database information to be provided to said user according to said current moving purpose and a profile of said user; and a transmitter for outputting provided information selected by said provided information selecting unit through a wireless network to the terminal, wherein said current moving purpose includes at least work or leisure.

2. The system according to claim 1, further comprising a device for obtaining historical moving purpose information of said user; and said route type determining unit for determining a route type or said current moving purpose based upon said obtained historical moving purpose information.

3. The system according to claim 1, wherein said receiver obtains information related to a starting point and said destination point, as well as a time on which said information is obtained through said network; and said route type determining unit uses said obtained starting and destination points information and said time to determine the route type.

4. The system according to claim 1, wherein said provided information selecting unit identifies said terminal and uses user information of said terminal user stored in storage means to select said provided information.

5. The system according to claim 2, wherein said provided information selecting unit identifies said terminal and uses user information of said terminal user stored in storage means to select said provided information.

6. The system according to claim 3, wherein said provided information selecting unit identifies said terminal and uses user information of said terminal user stored in storage means to select said provided information.

7. The system according to claim 1, wherein said system further includes a route information storage unit for storing route information determined by said route type determining unit and information used to determine said route type; and wherein said provided information selecting unit also refers to route history data stored in said route information storage unit to select information to be provided.

8. The system according to claim 2, further comprising a route information storage unit for storing route information determined by said route type determining apparatus and information used to determine said route type, wherein said provided information selecting unit also refers to route history data stored in said route information storage unit to select information to be provided.

9. The system according to claim 3, further comprising a route information storage unit for storing route information determined by said route type determining apparatus and information used to determine said route type, wherein said provided information selecting unit also refers to route history data stored in said route information storage unit to select information to be provided.

10. The system according to claim 1, further comprising a unit for determining whether said user is leaving a second destination point or returning the second destination point, wherein said provided information selecting unit uses information that differs between leaving and returning to the second destination point to select said provided information.

11. The system according to claim 2, further comprising a unit for determining whether said user is leaving a second destination point or returning to the second destination point, wherein said provided information selecting unit uses information that differs between leaving and returning to the second destination point to select said provided information.

12. The system according to claim 8, wherein said route information storage unit also stores information related to places visited by said user, which is received through said network;

wherein said provided information selecting unit searches route history data for routes similar to a current route on which said user is moving in said route information storage unit to select said destination point or information related to said destination point according to the information of said visited places included in said searched route history data.

13. The system according to claim 2, wherein said provided information selecting unit reads out a text in a synthesized voice and changes the quality and/or rhythm of said voice according to said route type determined by said route type determining apparatus.

14. An information providing apparatus travelling along with a user, comprising:

a storage unit for storing map information;

a detecting device for detecting a current position of the user;

an input device for inputting a destination point and a current moving purpose of the user;

a display device;

means for guiding the user to a current route between said current position and the destination point; and a transmitter for outputting a request for searching information to be provided to said user according to said current moving purpose and a profile of said user through a wireless network, wherein said display device displays information of facilities along the current route received through said network.

15. The apparatus according to claim 14, further comprising a voice synthesizer, and wherein an input through said input device is made interactively with said user.

16. The apparatus according to claim 14, said display device displays information-of near-by shops and stores existing along the route on which the user is moving.

* * * * *